E. B. HESS AND L. C. MYERS.
TYPEWRITING MACHINE.
APPLICATION FILED MAY 11, 1920.
1,427,464.
Patented Aug. 29, 1922.
14 SHEETS—SHEET 2.
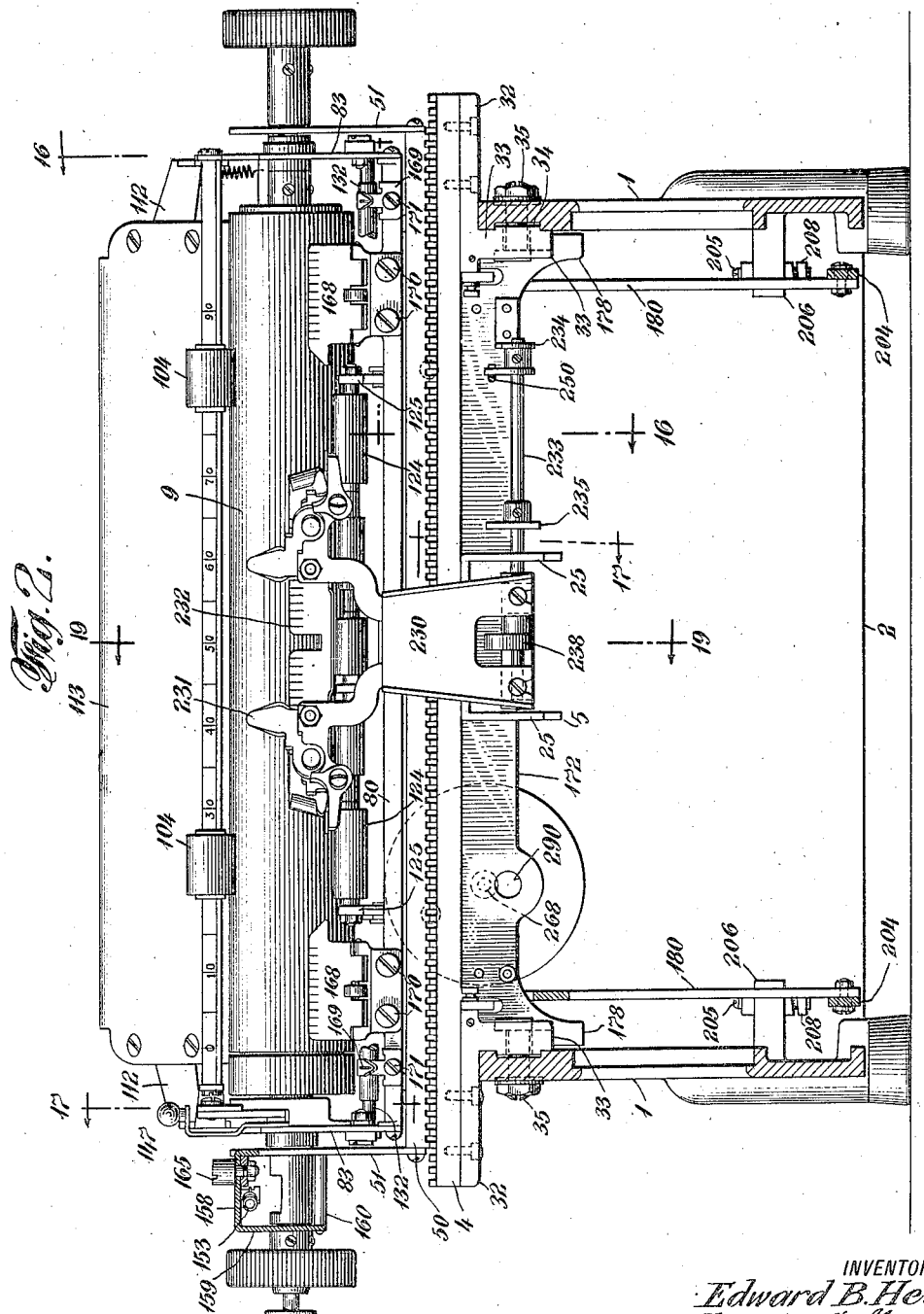
INVENTORS
Edward B. Hess
Lewis C. Myers
BY
ATTORNEY

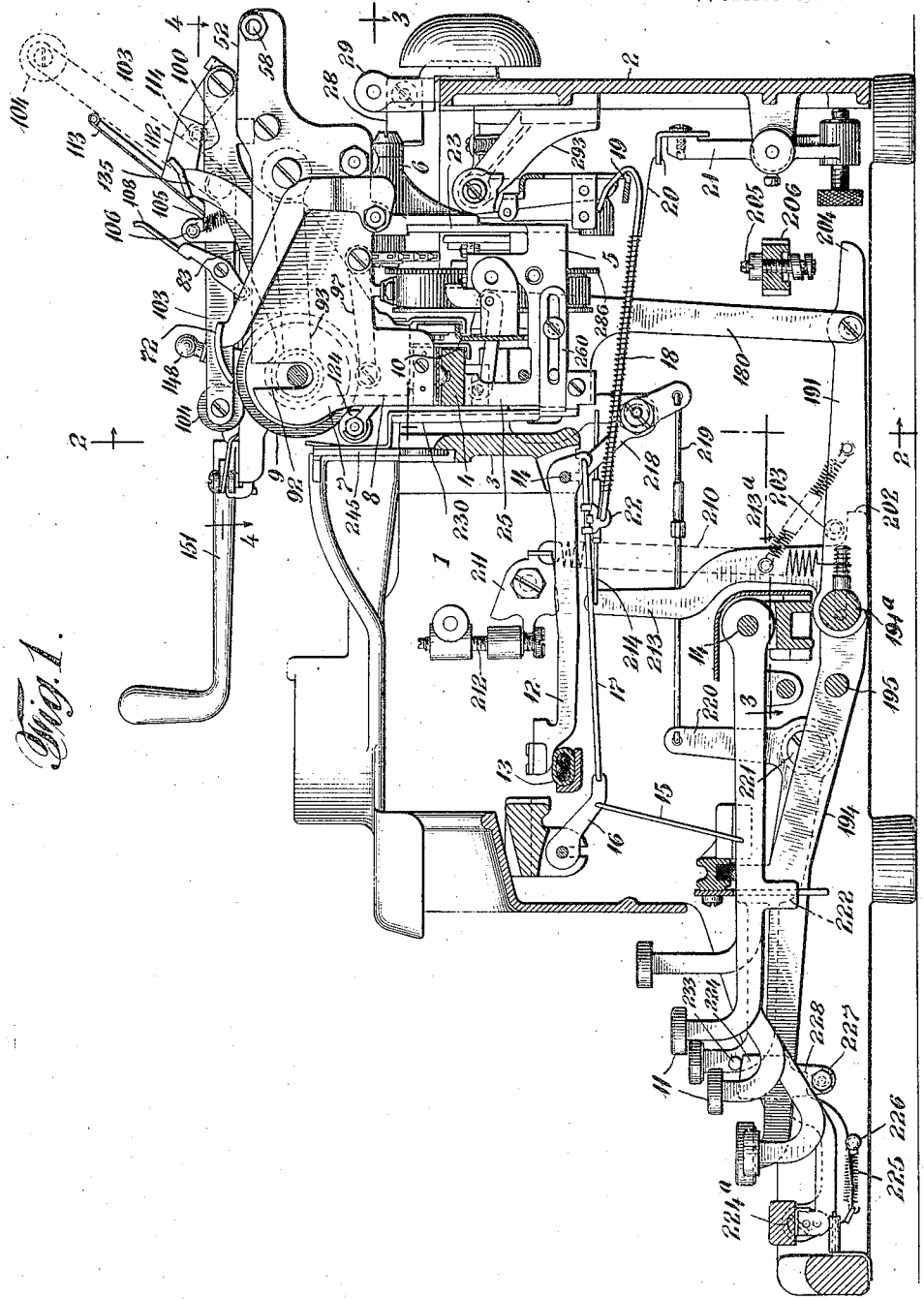

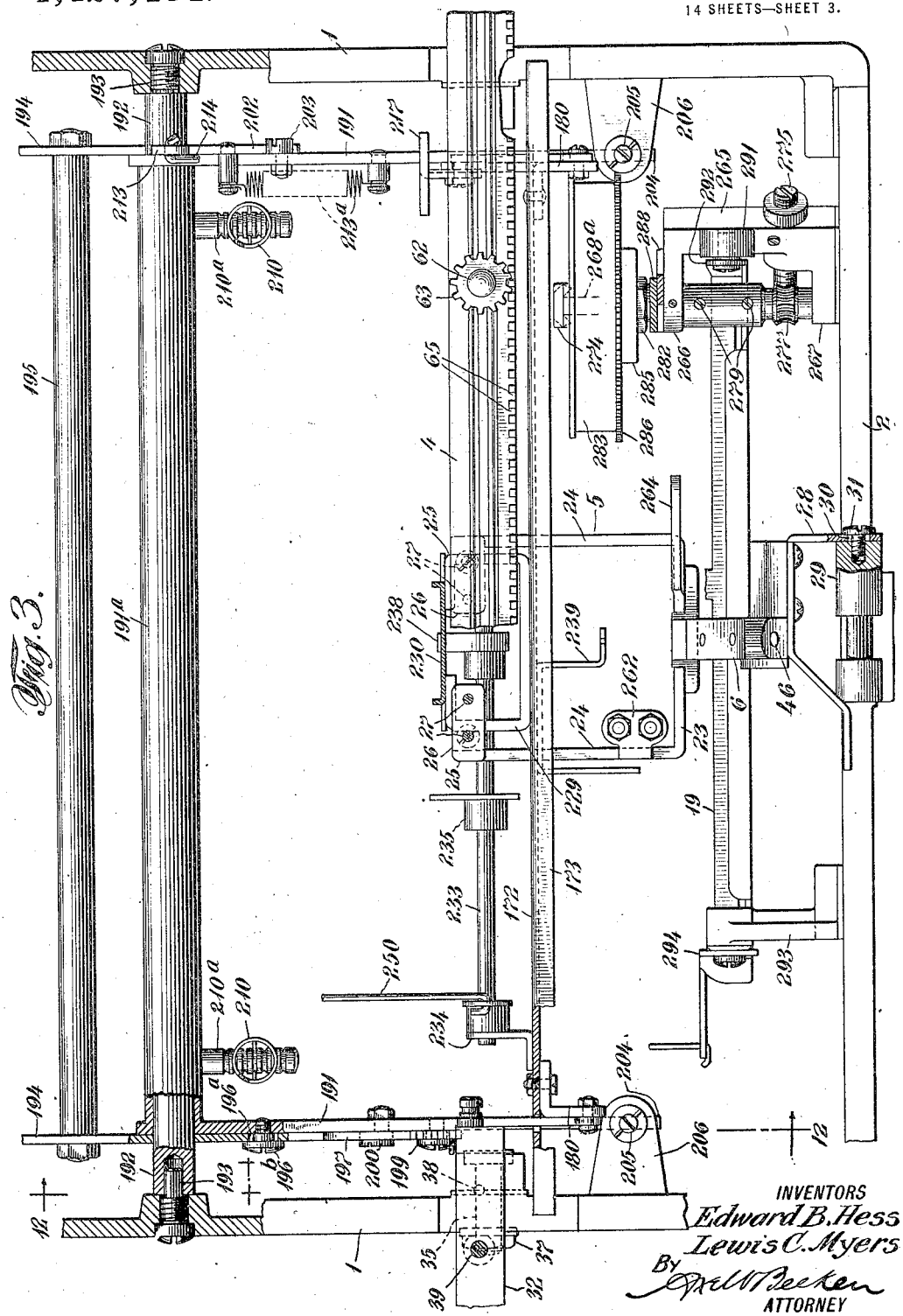

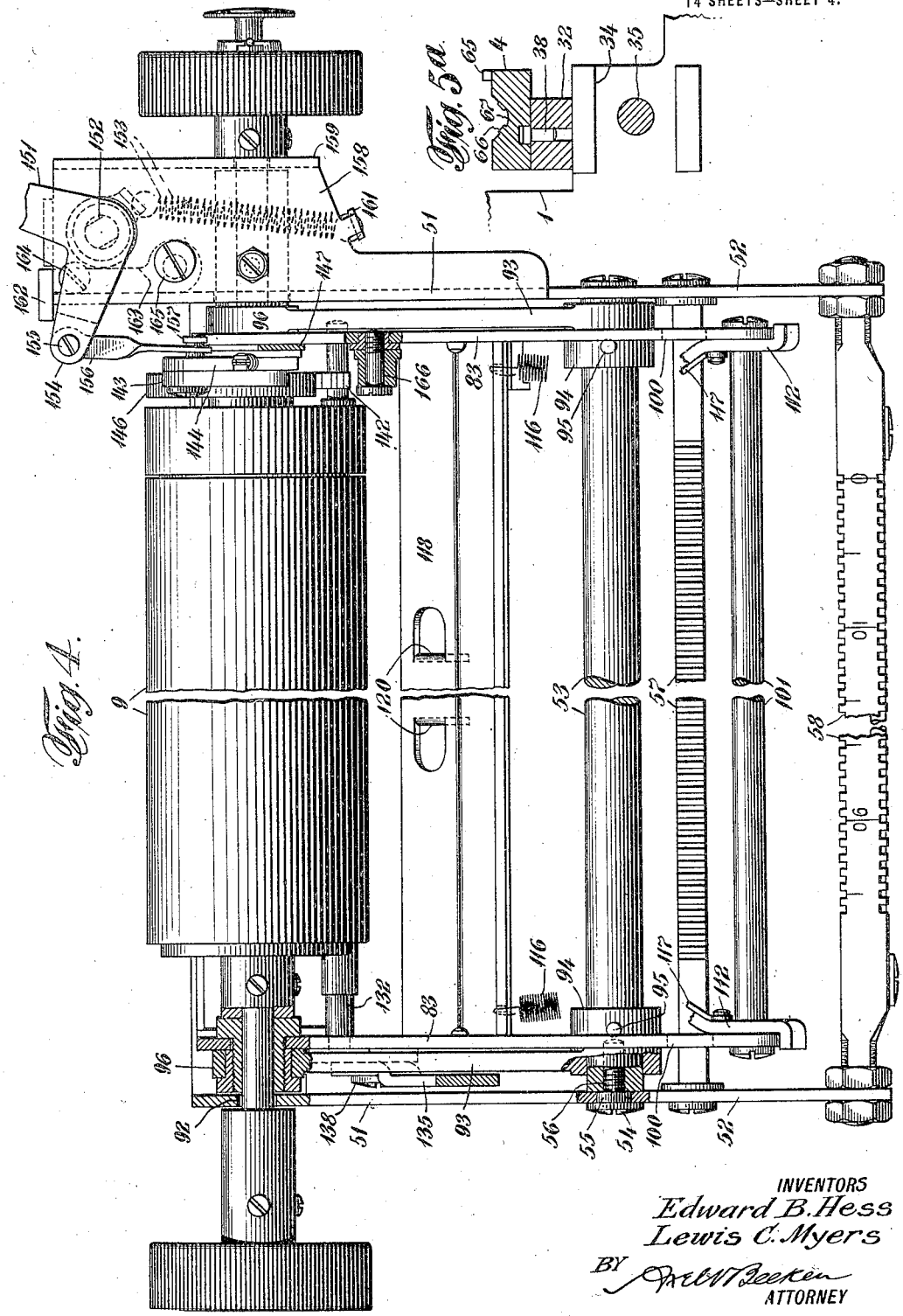

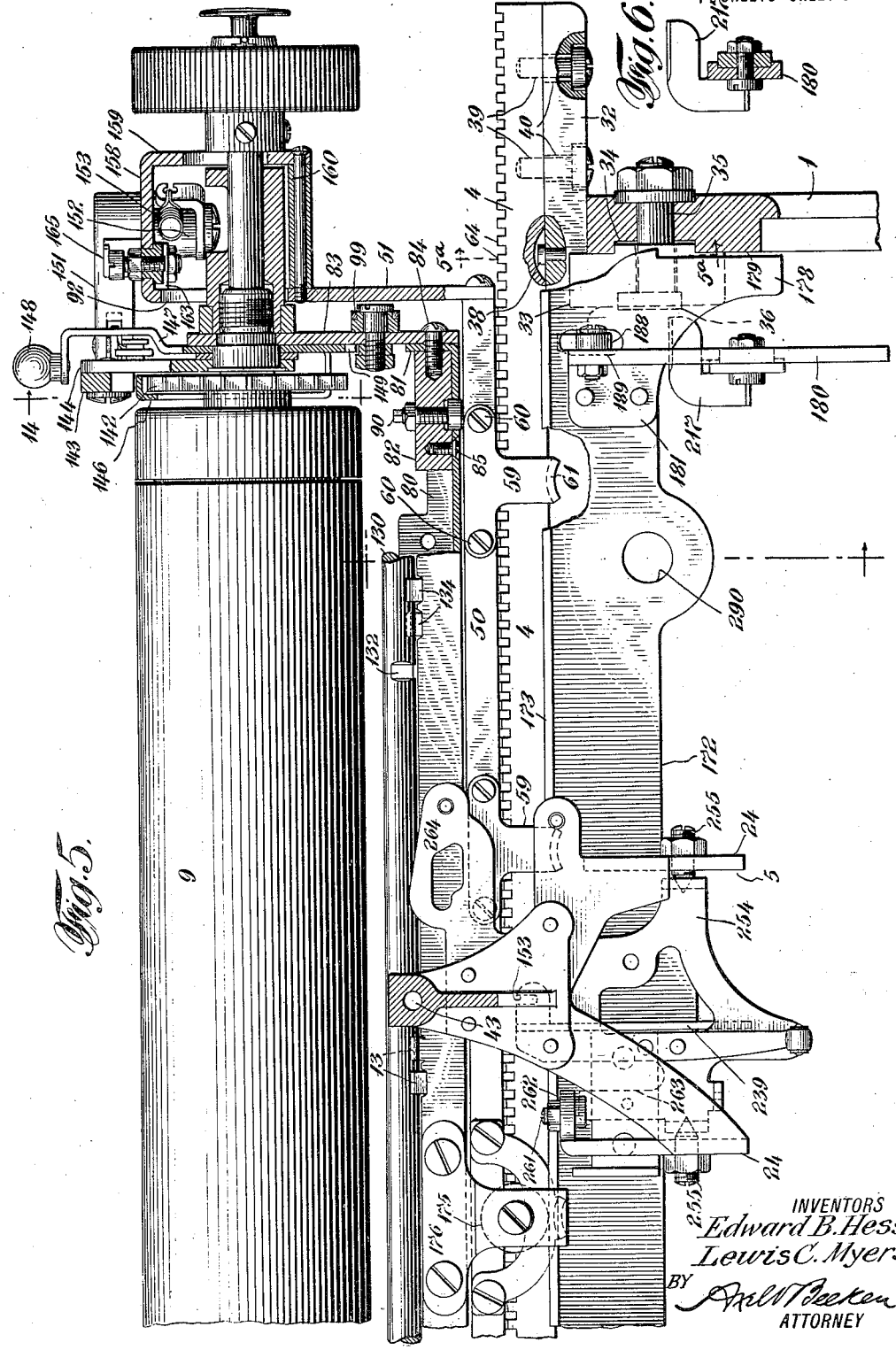

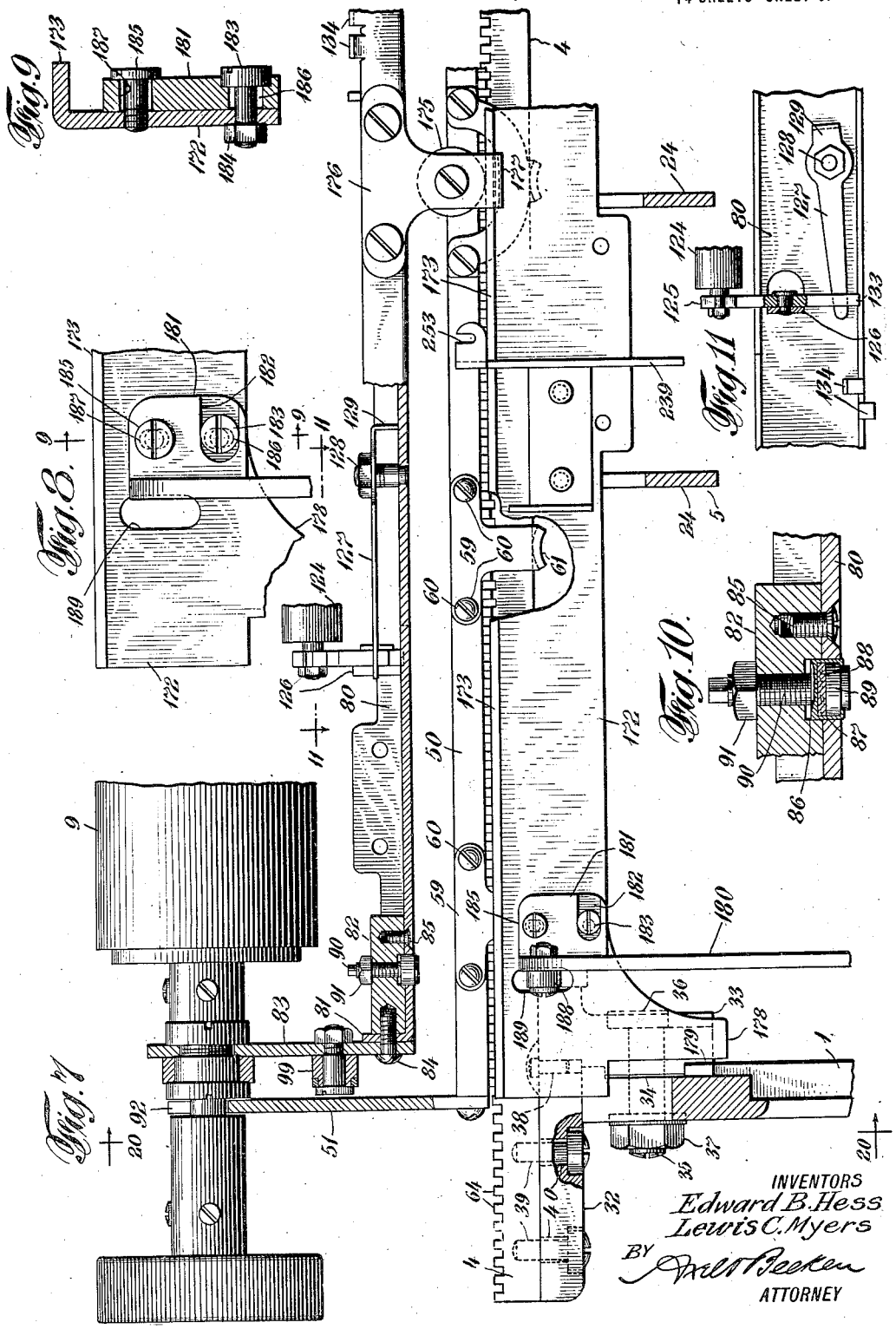

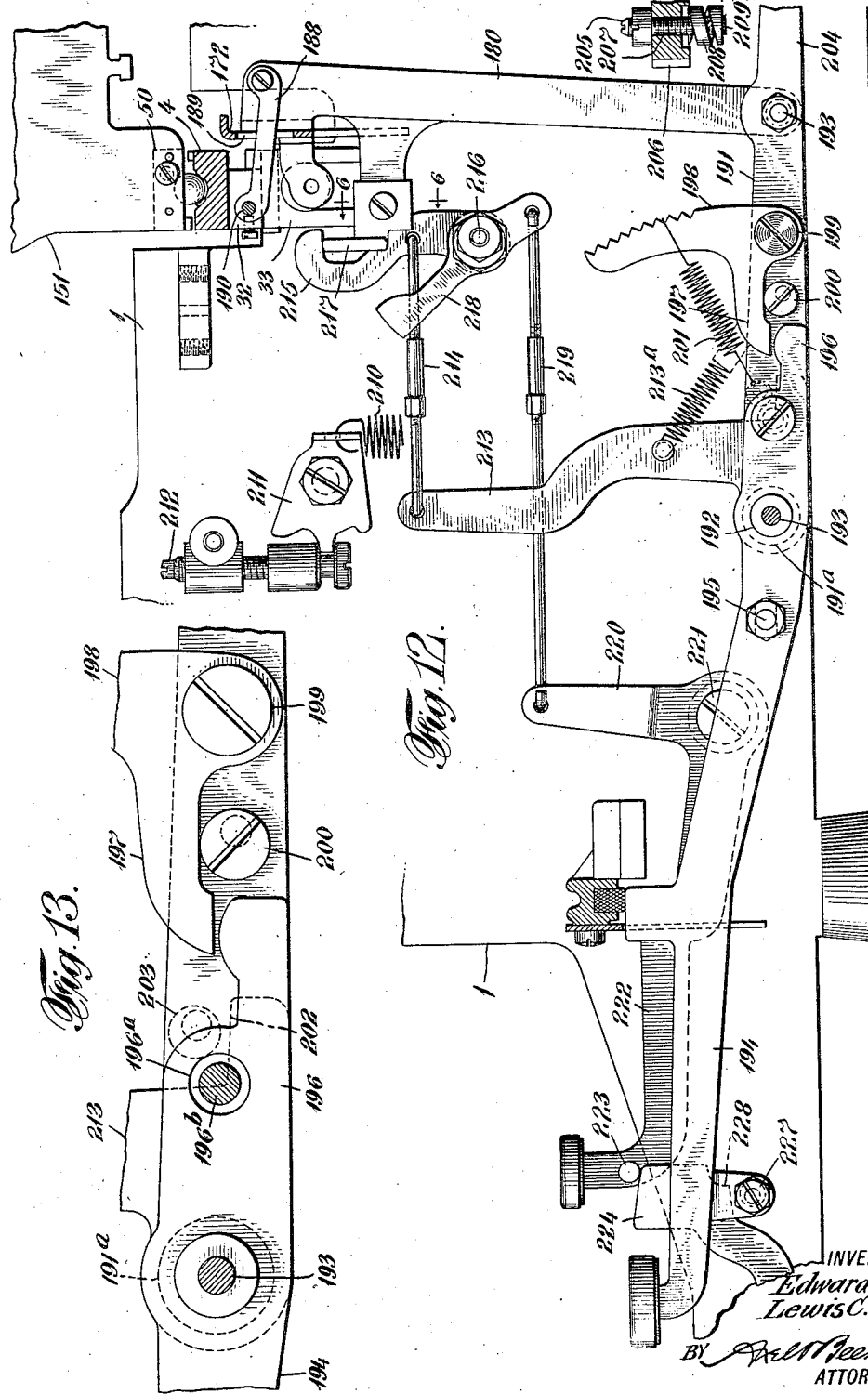

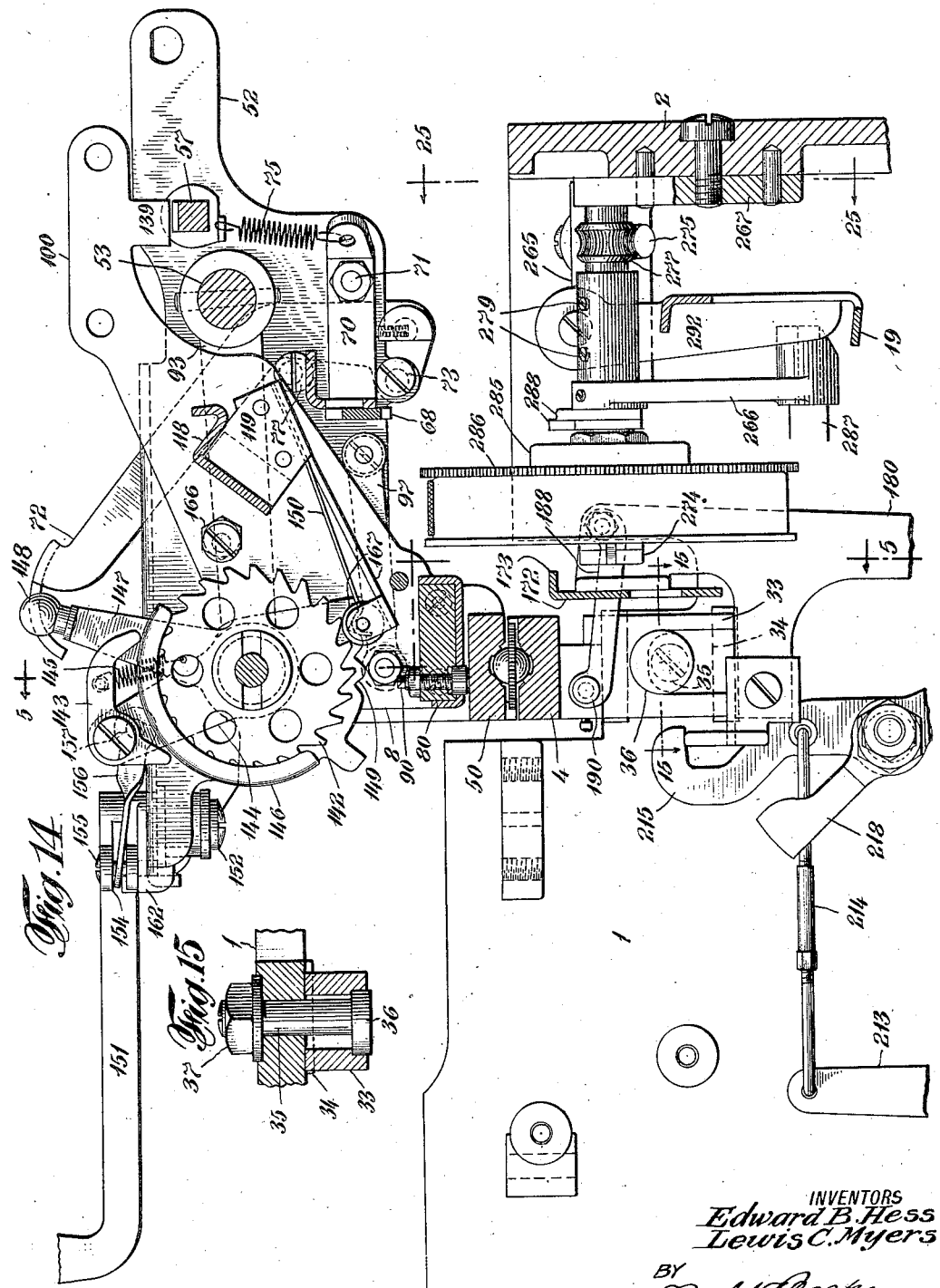

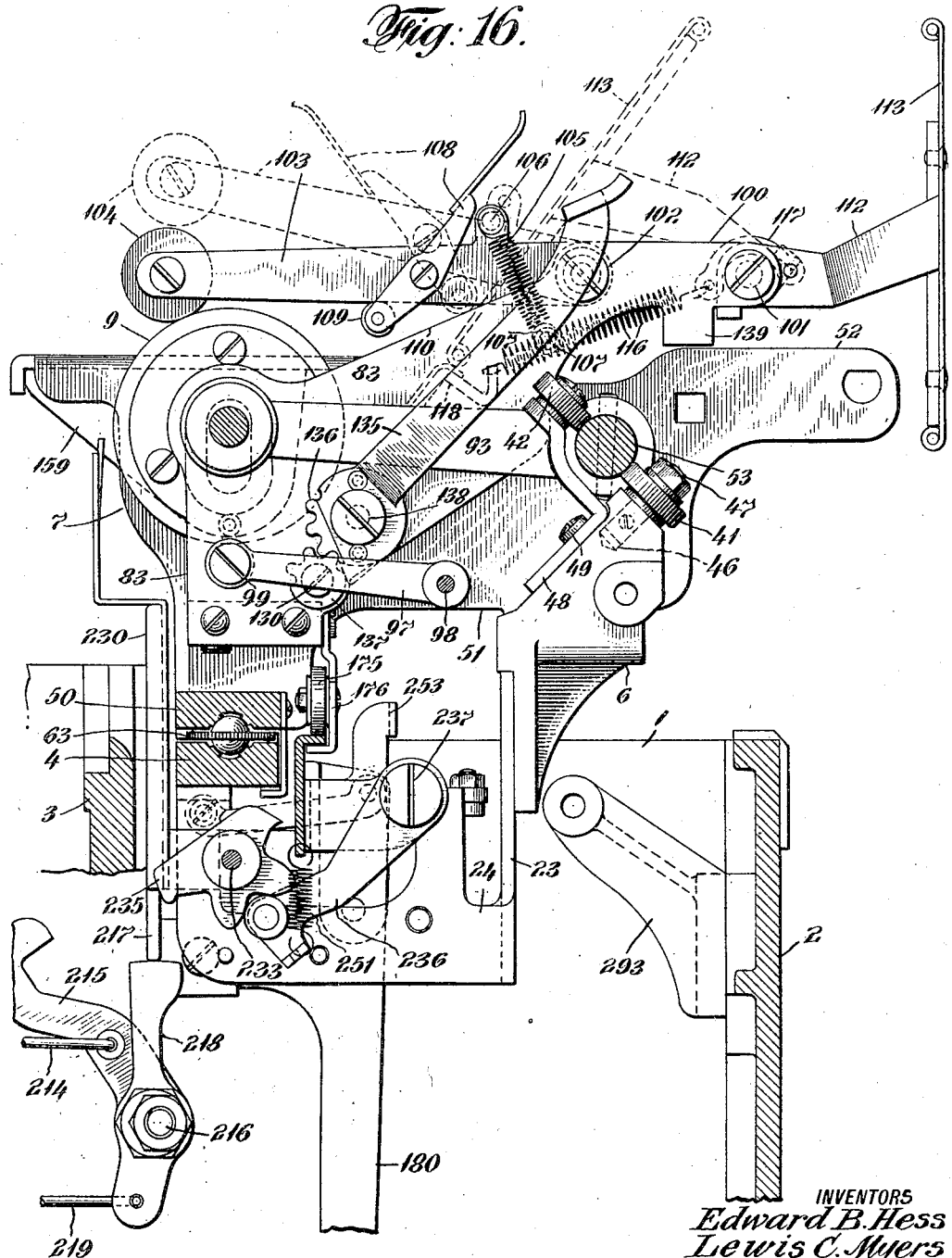

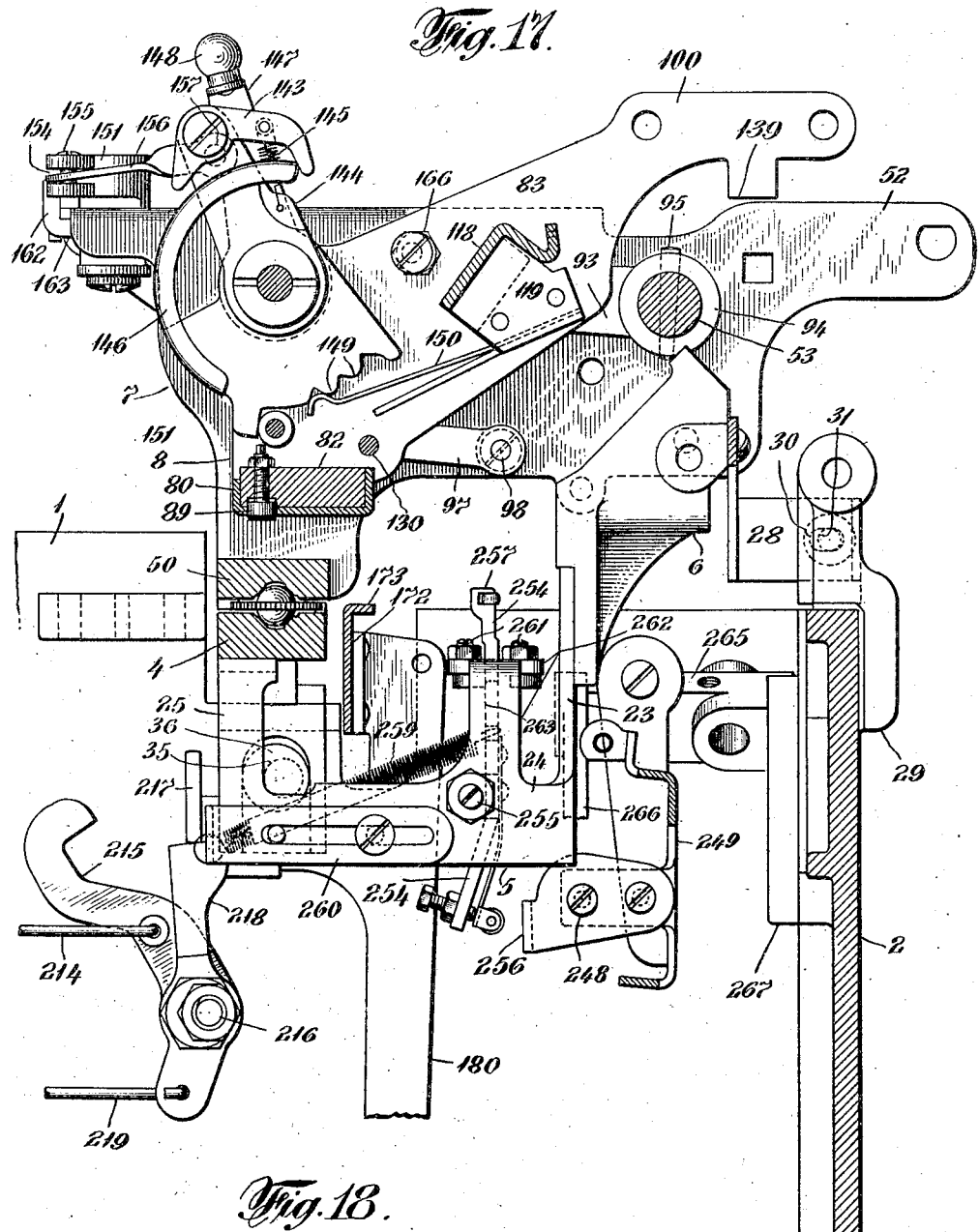

E. B. HESS AND L. C. MYERS.
TYPEWRITING MACHINE.
APPLICATION FILED MAY 11, 1920.

1,427,464.

Patented Aug. 29, 1922.
14 SHEETS—SHEET 11.

INVENTORS
Edward B. Hess
Lewis C. Myers
BY
ATTORNEY

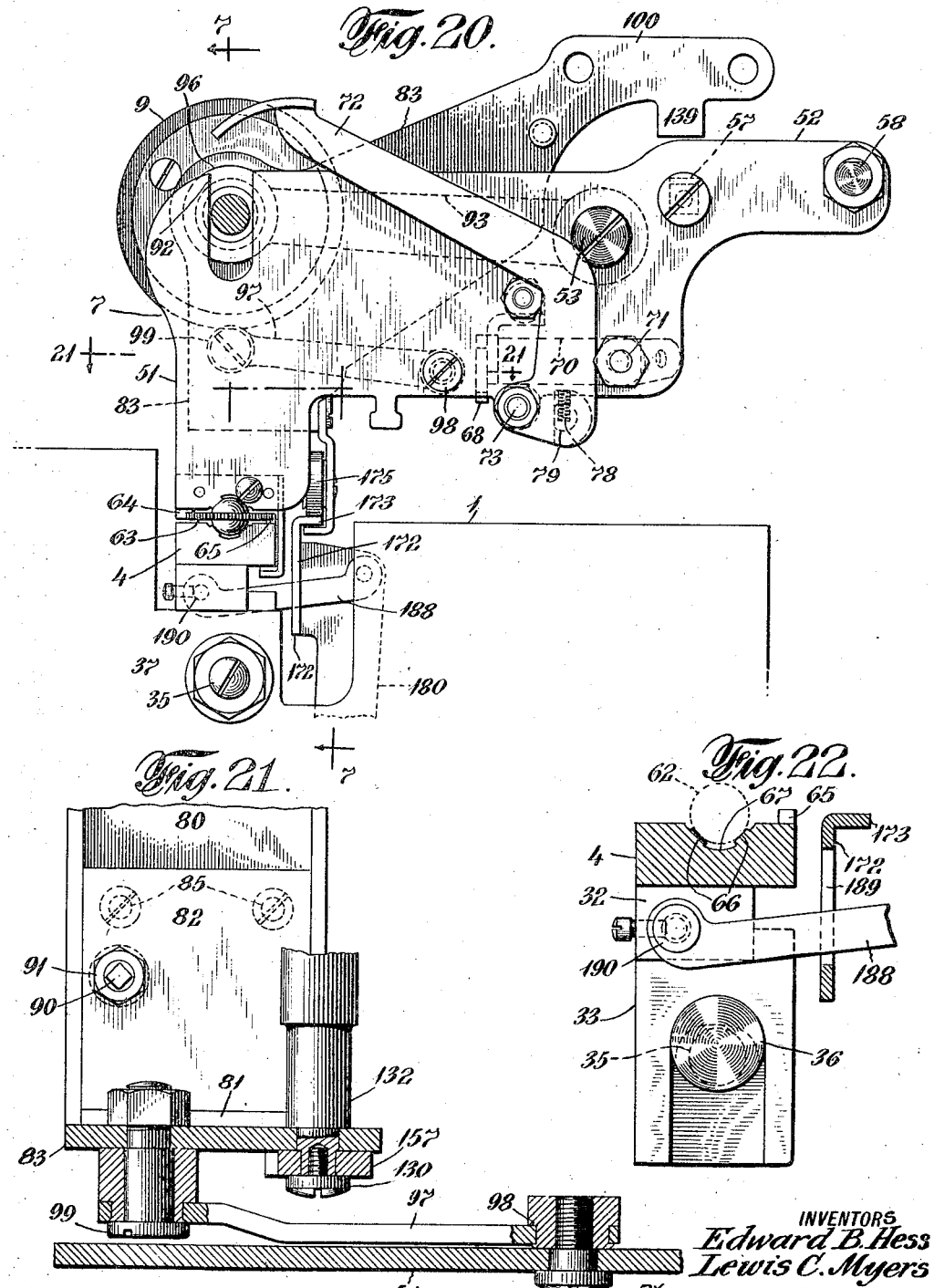

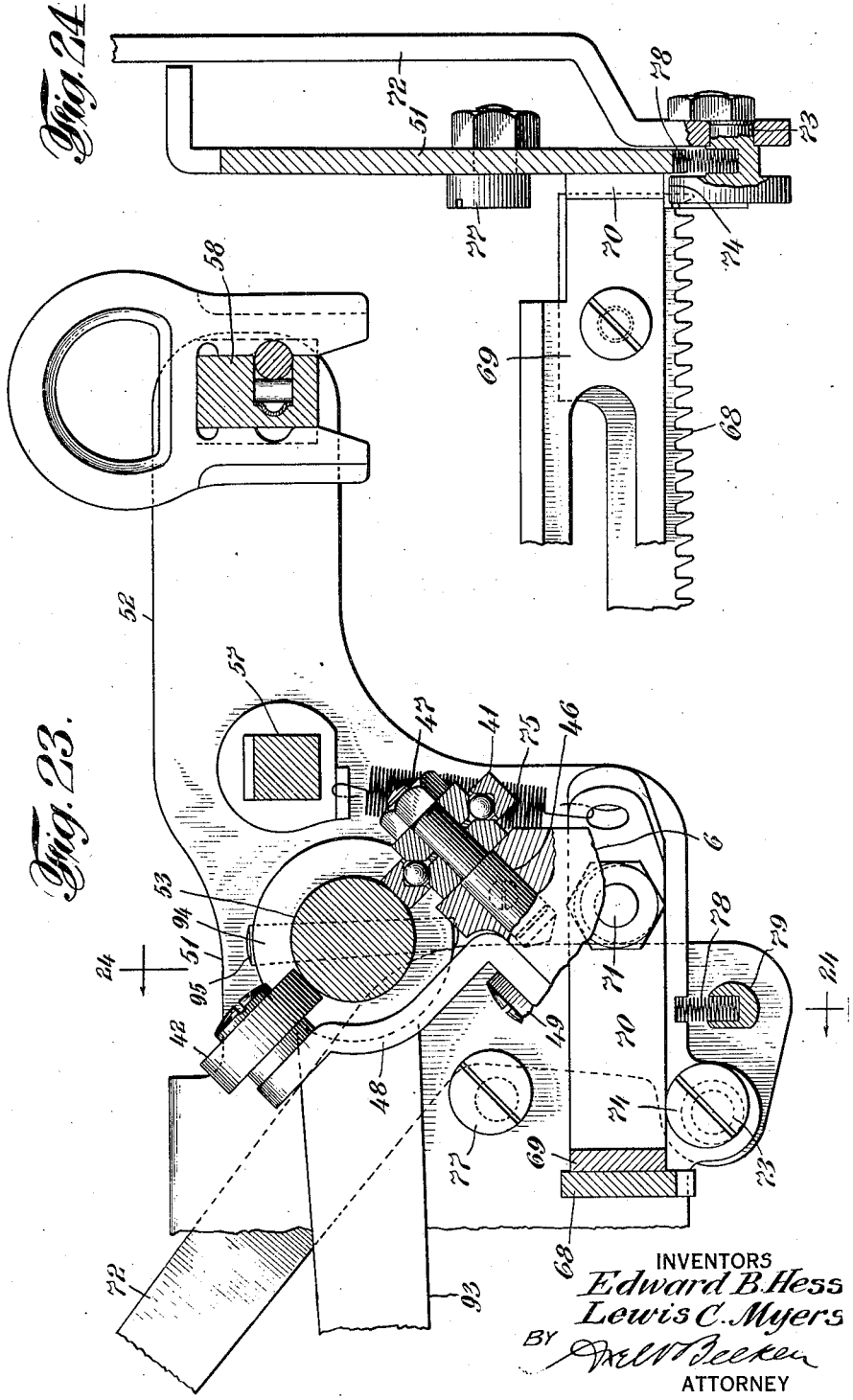

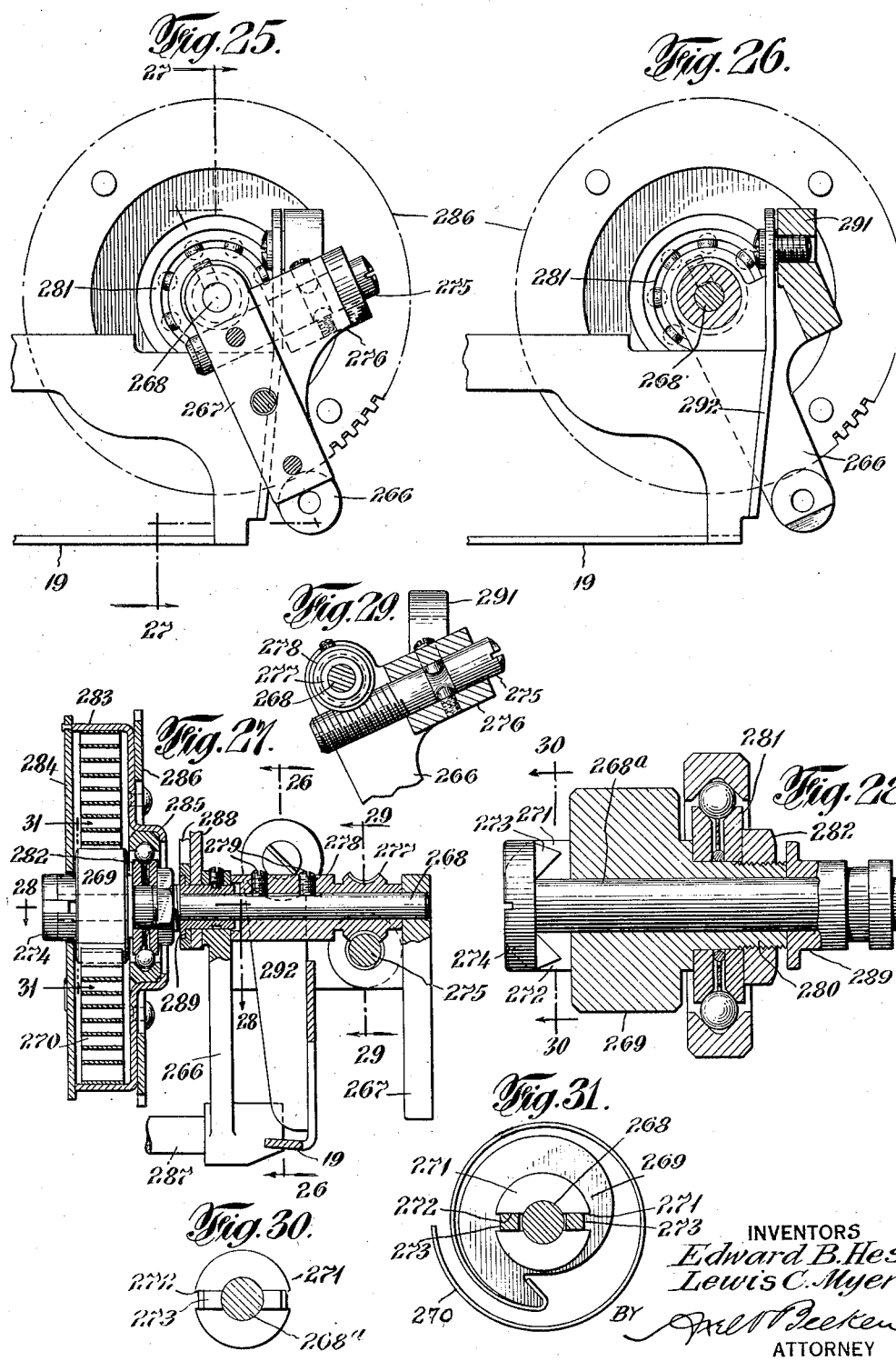

UNITED STATES PATENT OFFICE.

EDWARD B. HESS AND LEWIS C. MYERS, OF BROOKLYN, NEW YORK, ASSIGNORS TO ROYAL TYPEWRITER COMPANY, INC., OF NEW YORK, N. Y., A CORPORATION OF NEW YORK.

TYPEWRITING MACHINE.

1,427,464.  Specification of Letters Patent.  Patented Aug. 29, 1922.

Application filed May 11, 1920. Serial No. 380,601.

*To all whom it may concern:*

Be it known that we, EDWARD B. HESS and LEWIS C. MYERS, citizens of the United States of America, and residents of the city of New York, in the borough of Brooklyn, county of Kings, and State of New York, have invented certain new and useful Improvements in Typewriting Machines, of which the following is a specification.

The present invention relates generally to typewriting machines and has for its main object means whereby the well-known Royal typewriter is converted from a construction employing a shiftable carriage, that in turn supports a transversely traveling platen carriage, to a construction in which a transversely traveling carriage supports a shiftable platen carriage. Other objects will appear as the specification proceeds.

In accordance therewith the invention consists of the hereinafter described features of construction, a preferred form of which is disclosed in the accompanying specification.

Fig. 1 is a vertical longitudinal section on an irregular line through a typewriting machine embodying the invention with parts broken away and omitted.

Fig. 2 is a vertical transverse sectional view on the line 2—2 of Fig. 1.

Fig. 3 is a horizontal sectional plan view on the line 3—3 of Fig. 1 with parts omitted and broken away.

Fig. 4 is a horizontal sectional plan view of the platen and adjacent elements on the line 4—4 of Fig. 1 with parts broken away.

Fig. 5 is a vertical sectional view on the line 5—5 of Fig. 14 showing the parts adjacent to the left hand end of the platen looking from the rear.

Figure 19:
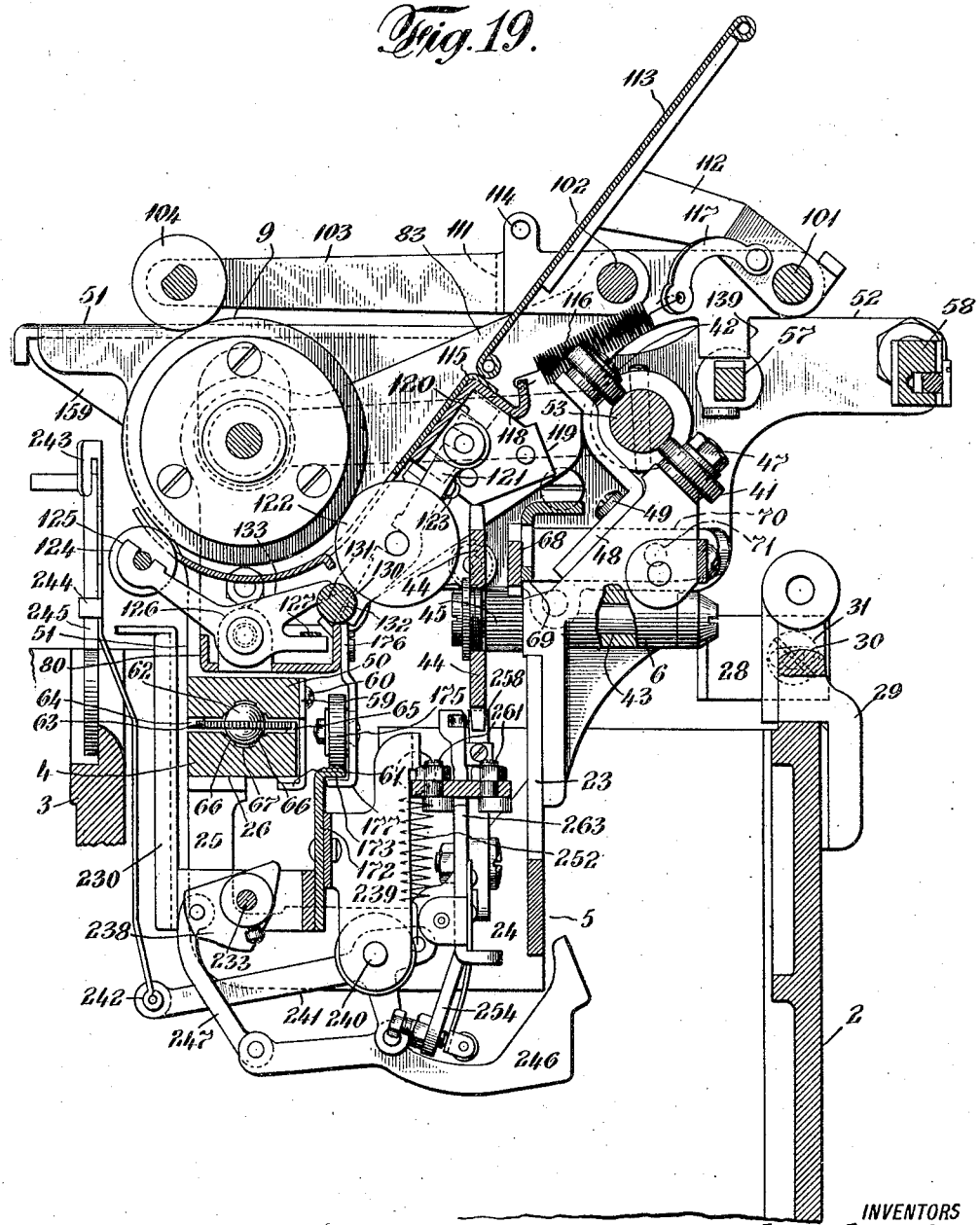

Fig. 5$^a$ is a detail sectional view on the line 5$^a$—5$^a$ of Fig. 5.

Fig. 6 is a detail sectional view on the line 6—6 of Fig. 12.

Fig. 7 is a vertical sectional view on the line 7—7 of Fig. 20 showing the elements adjacent to the right hand end of the platen looking from the rear, with parts broken away.

Fig. 8 is a detail of part of Fig. 7 showing the connection between the lifting rail and lifting arm.

Fig. 9 is a sectional view on an enlarged scale on the line 9—9 of Fig. 8.

Fig. 10 is an enlarged view in section of a part of the lifting carriage shown in Fig. 7.

Fig. 11 is an enlarged view in plan with parts broken away and in section, the view being substantially on the line 11—11 of Fig. 7.

Fig. 12 is a vertical longitudinal sectional view on the line 12—12 of Fig. 3 showing more particularly the lifting carriage shift actuating and locking means.

Fig. 13 is an enlarged view of the lower part of Fig. 12.

Fig. 14 is a vertical sectional view on the line 14—14 of Fig. 5.

Fig. 15 is a sectional detail view on the line 15—15 of Fig. 14.

Fig. 16 is a vertical sectional view on the line 16—16 of Fig. 2.

Fig. 17 is a vertical sectional view on the line 17—17 of Fig. 2, with the card holder, bichrome shaft and other parts omitted.

Fig. 18 is a detail sectional view of a modified form of the lifting carriage stop shown in the upper right hand corner of Fig. 20.

Fig. 19 is a vertical sectional view on the line 19—19 of Fig. 2.

Fig. 20 is a vertical sectional view on the line 20—20 of Fig. 7.

Fig. 21 is a horizontal sectional view on the line 21—21 of Fig. 20.

Fig. 22 is an enlarged detail view of the lower carriage rail and adjacent parts shown in Fig. 14.

Fig. 23 is an enlarged detail view of the parts shown in the upper right hand corner of Fig. 19.

Fig. 24 is a sectional view on the line 24—24 of Fig. 23.

Fig. 25 is a detail view of the spring barrel and supporting means therefor on a section on line 25—25 of Fig. 14.

Fig. 26 is a sectional view on the line 26—26 of Fig. 27.

Fig. 27 is a sectional view on the line 27—27 of Fig. 25.

Fig. 28 is an enlarged sectional view on the line 28—28 of Fig. 27.

Fig. 29 is a detail sectional view on the line 29—29 of Fig. 27.

Fig. 30 is a detail sectional view on the line 30—30 of Fig. 28.

Fig. 31 is an enlarged detail sectional view on the line 31—31 of Fig. 27.

The framing of the machine consists of the main frame work having side walls 1 and a rear wall 2 and supplementary framing comprising a segment support 3, lower stationary raceway 4, extending transversely across the machine and supported in the side walls 1, together with escapement framing extending longitudinally of the machine and consisting of an escapement frame 5 connected with the underside of lower raceway 4, and escapement wheel support 6 connected with the escapement frame and with the rear wall 2.

Supported on the lower raceway 4 is a transversely movable carriage 7 in which is supported a shiftable carriage 8 carrying the platen 9, the said shiftable carriage being raised and lowered by means of shift rail 10 extending transversely across the machine above the escapement frame and in rear of lower raceway 4.

11 represents key levers of the usual construction for actuating a plurality of normally forwardly recumbent type bars 12 pivoted in segment 3 in front of and below the platen and engaging a headrest 13 when inactive. As here shown each key lever 11 is pivotally supported at 14 in a suitable bearing and connected by means of a vertical link 15 with a front link 16 connected with the rear of the type bar by means of a link 17. To link 17 is secured a bar or link 18, the rear end of which is bent to engage a universal bar 19, said link 18 being provided with a spring 20, the rear end of which is connected to an adjustable rocking frame 21 and the front end of which is secured to a member 22 carried by link 17. It will be understood that all the type bars when actuated move to a common printing point or center on the platen.

Referring to Figs. 3 and 19, escapement frame 5 is made of sheet metal and is composed of a rear plate 23, forwardly extending arms 24 and upwardly extending arms 25 having horizontally disposed faces 26, separated by a gap and extending transversely toward each other, said faces 26 being suitably secured, as by means of screws and rivets 27, to lower raceway 4. Connected with rear plate 23 is escapement wheel support 6 connected by means of an angle plate 28 with a center stop bracket 29. This connection is adjustable by providing an elongated opening 30 in said angle plate for the reception of a screw 31 tapped into bracket 29. Lower ball race 4 is secured to the escapement frame and is supported on the side walls of the main frame. The mounting of said lower ball race is effected in the following manner. (Figs. 2, 3, 5, 14, 15, 20 and 22.) Carried at each end of said lower ball race and attached to the underside thereof is a block 32 having two downwardly projecting legs 33, side walls 1 and legs 33 being provided with a complementary horizontally disposed groove-and-tongue connection 34. Extending through side wall 1 is an adjusting screw 35 having at its inner end an eccentric 36 that engages between downwardly projecting legs 33. 37 indicates a lock nut for securing adjusting screw 35 in a position to which it has been adjusted. From the foregoing it will be understood that the fore-and-aft adjustment of lower ball race 4 and the escapement framing may be obtained by means of eccentric 36 and slot 30 and screws 31 in center stop bracket. The precise means for securing the lower raceway and block 32 together consists here of dowel pin 38 and binding screws 39. Screws 39 extend through openings 40, in block 32, that have a slightly greater diameter than the diameter of screws 39 and are tapped into lower ball race 4 so that a binding or clamping action is effected when said screws are brought home; and, to prevent displacement of the lower raceway with respect to block 32, the head of dowel pin 38 is located in the lower ball race and its stem has a snug fit in block 32 (see Fig. 5ª).

The lower ball race 4 constitutes what may be termed a "mono-rail" support for the transversely traveling carriage 7, additional means for supporting the overhang of said carriage being provided on the escapement framing, said additional means here taking the form of two guide rollers 41 and 42. Escapement wheel support 6 is provided with a bushing 43 for the reception of the spindle of escapement wheel 44 and escapement pinion 45 and has an aperture 46 for the reception of screw 47 that holds the guide roller 41 in position. Guide roller 42 is carried by a plate 48 secured to support 6 by means of screw 49.

The transversely traveling carriage (see especially Figs. 1, 2, 5, 7 and 20) is composed of traveling ball race 50 and end standards 51 provided with rearwardly extending overhanging portions 52 in which are mounted a transversely extending guide rod 53 (which here takes the form of a rockshaft) that engages rollers 41 and 42. In the form here disclosed, rock shaft 53 (see Fig. 4) is held at each end by a bearing screw 54 having a bearing portion 55 fitting in an opening in overhang 52 and provided with a threaded stem 56 in engagement with a threaded opening in said rock shaft. 57 indicates a margin rail and 58 is a tabular bar, both of which are connected with overhanging portions 52 and which, in addition to the primary function implied by their names, also act as stay rods for the traveling carriage. 59 indicates clamps (see Figs. 5, 7 and 19) that are attached by means of screws 60 to upper ball race 50 and provided with horizontally extending and curved guide portions 61 that engage the underside of lower ball race 4. Between the upper and lower raceways are the usual balls 62 having encircling gears 63 engaging with racks 64 and 65 of said raceways. In connection with the construction of the upper and lower raceways (see Fig. 22) it is to be noted that the shape of the grooves with which balls 62 engage is unusual in that the grooves are provided with longitudinally extending raised portions 66 and a central gutter 67. The advantage of this construction in connection with the lower raceway is that dust or foreign particles of matter will not accumulate on surfaces 66 but will work into gutter 67 with which balls 62 are not in engagement thereby greatly facilitating smooth action of the parts.

Referring to Figs 14, 19, 20, 23 and 24, suitable carriage release means are provided which here take the following form. 68 is an escapement rack engaging escapement pinion 45 and mounted on rocking rail 69 having arms 70 pivotally mounted at 71 in end standards 51 of the carriage. 72 is an escapement release lever (one at each end) pivotally supported at 73 in end standard 51 and is provided with a cam 74 that engages with the underside of arm 70. Normally a spring 75, connected with the end of arm 70 and with margin rail 57, urges escapement rack into engagement with escapement pinion 45. When lever 72 is depressed, cam 74 will raise rail 69 and rack 68 thereby effecting release of the carriage. The downward movement of rail 69 is limited by eccentric cam 74, which may be adjusted to suit conditions, and the upward movement of rail 69 is limited by another eccentrically adjustable stop 77. To keep lever 72 from chattering, an expansion spring 78 is provided which bears against the under-surface of end standard 51 and a socket member 79 carried at the lower end of lever 72.

Referring to Figs. 2, 5, 7, 16, 17, 19 and 21: the shiftable carriage 8 is constructed as follows:—80 is a transversely extending and horizontally disposed channel member of sheet metal having bent ends 81 adjacent which are filling blocks 82. Said channel member is connected with end walls 83 of the shiftable carriage by means of screws 84 that pass through walls 83, ends 81 and into filling blocks 82. Channel member 80 and filling block 82 are also connected together by means of counter-sunk screws 85 (see Fig. 10) and suitable bumper stops are carried by filling blocks 82, said stops engaging with the upper side of upper raceway 50. In the present instance, this bumper stop is constructed as follows (see Fig. 10). A recess 86 is formed in the filling block and in the channel member in which is seated a cup shaped holder 87 containing a piece of leather or other similar substance 88 held in place by an abutment member 89 having a shoulder, as shown, under which passes the inturned edge of cup shaped member 87. Said cup shaped member is carried by a threaded stem 90 passing through filling block 82 and locked in position by means of a nut 91. There is a bumper structure of this character in each filling block. The shaft of platen 9 extends through end walls 83 in such manner that the platen is freely rotatable in said end walls; and said platen shaft also extends through vertical slots 92 in end standards 51 of the traveling carriage (see Figs. 1, 5 and 7). The shiftable carriage is mounted in two pairs of parallel arms (see Fig. 16) carried by the traveling carriage. One pair of these arms 93 are supported on the transversely extending guide rod 53 which, as previously pointed out, is a rock shaft with which the guide rollers 41 and 42 engage, each of these arms being provided with a bushing 94 secured to said rock shaft by pins 95 (Figs. 4 and 16) and the outer ends of arms 93 being provided with sleeves 96 through which the platen shaft passes. The other pair of parallel arms 97 are pivotally supported at 98 in end standards 51 of the transversely moving carriage and are pivotally connected at their outer ends 99 with end frame 83 of the shiftable carriage (see Figs. 16, 20, 21, 5 and 6). End walls 83 of the shiftable carriage have overhanging portions 100 that are connected by a transverse brace rod 101. 102 indicates the rock shaft of an overhead bail 103 (see Figs. 16 and 19), said bail carrying an overhead pressure roller 104 and said rock shaft being rigidly connected with bail 103 and mounted for oscillation in end walls 83. Normally, the overhead bail is urged into engagement with the upper surface of the platen by means of a spring 105 connected with pin 106 of said overhead bail and with pin 107 on the end walls of the shiftable carriage. Pivotally supported on bail 103 is a lever 108 having a suitable handle portion as shown and provided at its lower end with a roller 109 adapted to engage the top surface 110 of end walls 83, said top surface acting as a cam surface so that when lever 108 is manipulated in a forward direction, as indicated in dotted lines in Fig. 16, roller 109 will engage surface 110 and will elevate upper pressure roller 104 into an intermediate position out of engagement with platen 9. In addition to the foregoing, said overhead bail may be raised into the fully elevated position indicated in dotted lines in Fig. 1, said bail having a stop pin 106 that engages the upper surface of overhanging portions 100 of end walls 83. Paper table 113 is mounted on angular bracket arms 112 (see Figs. 2, 4, 16 and 19) that are pivotally supported by transverse brace rod 101 and is normally urged into its lowermost position in contact with a paper pan 115 by means of a spring 116 connected at one end with a curved and loosely pivoted link 117 on bracket arm 112, and, at its other end, with the transversely extending paper pan support 118. The normal position of said paper table is indicated in Fig. 19 and its extreme elevated position is indicated in Fig. 16 where it will be observed that, when said paper table occupies its rearwardly tilted position, link 117 does not interfere with brace rod 101 due to the curved formation of said link but occupies a position spanning rod 101, as indicated in Fig. 16.
Paper pan support 118 extends transversely between end walls 83, being attached to the latter by means of brackets 119, and is provided with struck-up portions 120 that form bearings for pendent levers 121 carrying a lower rear pressure roller 122 and normally urged into engagement with the platen by means of a flat spring 123 having one end secured to the paper pan support. 124 indicates a lower front pressure feed roll carried by a bell crank 125 pivotally supported in ears 126 struck up from transverse channel member 80 (Figs. 7, 11 and 19) and normally urged into engagement with the platen by means of a flat spring 127 mounted on a raised stud 128 (Figs. 7, 11 and 19) on said channel member and having its end 129 turned downwardly to engage the bottom of said channel member. A suitable releasing means for the pressure rolls are provided, having the form here of a cam bar 130 (Figs. 5, 16 and 19) rotatably mounted in end walls 83 and provided with cam portions or notches 131 and 132, one of which engages extension 133 of bell crank 125 and the other of which engages the end of pendent lever 121. Said cam bar 130 is also supported by means of oppositely extending struck-up portions 134 (Figs. 5, 7 and 11) formed in one of the side walls of channel member 80. It will be understood that when cam bar 130 is turned in the proper direction, lower pressure rolls 124 and 122 will move away from the platen. The means here provided for turning cam bar 130 consists of a handle 135 (Fig. 16) carrying a sector 136 meshing with a sector 137 on the end of cam bar 130. Lever 135 is pivotally supported at 138 in one of the end walls 83. Referring particularly to Figs. 17 and 18 overhanging portions 100 of end walls 83 are provided with stops, that supplement bumper stops 89, having here the form of a downwardly projecting abutment member 139 that engages margin rail 57 of the traveling carriage.

A modified form is shown in Fig. 18 in which member 139 is provided with an ear 140 for the reception of an adjustable screw 141 that engages margin rail 57 as a stop member.

Line space advancing mechanism is constructed as follows (see Figs. 2, 4, 5, 14 and 17). Connected with the platen shaft is a line space ratchet 142 adapted to be actuated by a pawl 143 pivotally mounted on an arm 144 loosely supported on the platen shaft. Pawl 143 is normally urged toward the ratchet by spring 145 connected at one end with the pawl and at its other end with arm 144. 146 indicates a shield or hood for covering the ratchet more or less to vary the effective stroke of the pawl in a manner well understood. Said hood is mounted on adjusting member 147 having handle 148 and carried loosely on the platen shaft. At its lower end, member 147 is provided with teeth 149 (Figs. 14 and 17) with which engages spring detent 150 carried by a paper pan supporting bracket 119. A line space advancing lever 151 in the form of a bell crank is mounted on a vertical pivot at 152 on the traveling carriage (but not on the shiftable carriage) and is normally urged into one of its positions by spring 153. One end of bell crank 151 is bifurcated as at 154 for the reception of a pivot pin 155 on which is loosely mounted a twisted link 156 which latter is also connected with pivot pin 157 on arm 144. It will be seen that pin 155 constitutes a vertical pivot and pin 157 a horizontal pivot for twisting link 156 and that the connection is in effect a universal joint. From Figs. 14 and 17 it will be seen that the connection of link 156 with pin 155 is at a point substantially midway between upper and lower case position of pin 157 so that line space advance may be effected in either position from the line space advancing lever. One of the end standards 51 of traveling carriage 7 is provided with an outwardly extending portion 158 terminating in a downwardly extending portion 159, said downwardly extending portion 159 tapering downwardly, (as best indicated in Fig. 16) and connected at its lower end by a threaded stem and sleeve 160 with end standard 51 (see Fig. 5). Pivot pin 152 of bell crank 151 is mounted in extension 158 and spring 153 is housed beneath extension 158 and attached to projection 161 at the underside of 158. 162 indicates a stop member for limiting the rearward movement of bell crank 151. This stop member is a prolongation of a plate 163 secured to the underside of extension 158 by a screw 164. 165 is an eccentrically adjustable stop member for limiting the forward movement of bell crank 151, this stop member passing through extension 158 and into plate 163. An eccentrically adjustable stop member 166 is provided on end wall 83 of the shiftable carriage for the purpose of limiting the forward movement of pawl 143. The click 167 for ratchet 142 is carried by the paper pan supporting bracket 119.

In addition to the elements above described, the shiftable carriage also supports suitable scale indication and pointer means as shown in Fig. 2 where scale means 168 and pointer means 169 are secured to channel member 80 by suitable screws 170 and 171.

Suitable means are provided for lifting and lowering the shiftable carriage which, in this instance, comprises essentially a shift rail 172 extending transversely of the machine above the escapement frame (see Fig. 19) and consisting of an angular piece of sheet metal, one face of which constitutes a horizontal track 173 on which travels the shiftable carriage traveling roller 175 carried by a suitable carriage clamp 176 (see Fig. 7) having a horizontally extending guide member 177 engaging with the under side of horizontal track 173. Clamp 176 is secured in any suitable manner to channel member 80.

At each of its ends said shift rail has a downwardly extending projection 178 (see Figs. 2, 5 and 8) closely adjacent the abutment surfaces 179 of the side wall of the main frame to take up the end thrust of the carriage. Said shift rail is carried by two vertical shift arms 180 one at each end of the machine to which it is attached by means of angular extensions 181 (Figs. 7, 8 and 9). In the present instance, provision is made for vertically adjusting said shift rail with respect to one or both of the vertical shift arms 180. As shown, angular extensions 181 are provided with a horizontal slot 182 in which is seated an eccentric adjustment member 183, the stem of which passes through shift rail 172 and is locked in position by means of lock-nut 184. Eccentric member 183 thus constitutes a binding screw that clamps shift rail 172 and extension 181 together. 185 is a second binding screw that passes through extension 181 and is tapped into shift rail 172. At the point where binding screws 183 and 185 pass through extension 181, there are vertically elongated openings 186 and 187. If binding screws 183 and 185 are loosened, it will be understood that, by shifting the eccentric 183, rail 172 may be adjusted vertically so as to render said shift rail parallel with the lower raceway, after which the binding screws are tightened to retain the parts in the position to which they have been adjusted. Said shift rail and shift arms are carried by two pairs of parallel links (see Fig. 12), an upper pair 188, pivotally connected with vertical shift arms 180 at one end and extending through openings 189 in the shift rail and pivotally supported on pin 190 carried in block 32 of lower raceway 4 (see Fig. 22); and another and lower pair, 191 having a sleeve 191ª secured on rock shaft 192 and having pivotal connection at 193 with shift arms 180. It will be observed that by this construction shift rail 172 is adjusted fore-and-aft in unison with the lower raceway and escapement frame. Any suitable means may be used to actuate shift rail 172 but in the present instance two shift key levers 194 are loosely mounted on rock shaft 192 and are connected together by a transverse tie-rod 195 so that when either shift key lever is actuated the other is also actuated. (See Fig. 3.) One of the shift key levers is provided with a rearwardly projecting member 196 that engages an arm 197 of an intermediate cushioning member 198 pivotally supported at 199 on one of parallel links 191, said arm 197 being normally held against adjustable stop 200 by reason of a spring 201 connecting intermediate member 198 with one of parallel arms 191. Member 196 is also provided with an opening 196ª (Fig. 13) through which extends stop 196ᵇ on one of arms 191. The other of said levers, 194, is provided with an extension 202 (Figs. 1, 3 and 13) that engages with an eccentrically adjustable stop 203 on the other of said arms 191. Each of parallel arms 191 is provided with a rearwardly extending stop portion 204 that comes in contact with a compressible bumper stop 205. Said bumper stops are carried by lugs 206 extending from the side walls of the frame and consists each of a threaded stem 207 having an enlarged helical spring portion 208 provided with a leather or felt filler 209. This bumper stop limits the upward movement of the shiftable carriage. 210 indicates the carriage balance springs supported at their upper end in brackets 211, each adjustable by means of screw 212 conveniently located directly under the ribbon spool on the dust shed and readily accessible from the top of the machine for adjustment. The lower end of said springs 210 are secured on pins 210ª passing through sleeve 191ª into rock shaft 192. (Fig. 1.) Rigidly connected to one of shift key levers 194 is an arm 213 connected by means of link 214 to lock dog 215 which latter is pivotally supported on a center 216 and is adapted to engage with the upper surface of a shift locking plate 217 carried on one of the vertical shift arms 180 (see Figs. 5 and 6). A spring 213ª connects arm 213 with one of parallel arms 191. Center 216 is a center fixed on the frame work and carries another shift locking dog 218 connected by means of a link 219 with an upright arm 220 pivotally supported at 221 and forming a part of a shift lock key lever 222. Shift lock key lever 222 is provided with a pin 223 normally engaged by latch 224 pivotally supported at 224ª (Fig. 1) and urged into an upward position by spring 225 connected to the frame work at 226. The action of this spring is transmitted through the connections described and normally holds locking dog 218 out of engagement with shift lock plate 217. Spring 213ª through its connection with member 213, normally holds locking dog 215 in engagement with shift locking plate 217 and also serves to maintain shift key levers 194 in an elevated position. One of said shift key levers is provided with a pin 227. When shift key lever 194 is depressed, extension 196 will engage arm 197 of cushioning member 198 and the lower part of opening 196ª will engage stop 196ᵇ and, at the same time, extension 202 will engage stop 203. This will cause arms 191 to be elevated, thereby moving lock dog 215 out of engagement with shift locking plate 217 and will cause the elevation of vertical shift arms 180 and hence shift rail 172. This upward action will continue until the stop portions 204 engage bumper stops 205. It will be noted that when shift lever 194 is depressed, the movement will be cushioned, in part, by engagement of extension 196 with arm 197 and that thereafter upward movement will be limited and cushioned by bumper stop 205 after which a requisite cushioning effect will again be obtained by the action of the members 196 and 197. Lowering of the elements will be cushioned by carriage shift balance spring 210 in the usual way and by bumper stops 89 (Figs. 7 and 10). If shift key locking lever 222 is depressed, latch 224 will be tilted in a downward direction carrying with it shift key lever 194 and this downward movement will continue until surface 228 of the latch locks against pin 227. In these circumstances, not only will the action previously described take place but locking dog 218 will swing in beneath shift locking plate 217 and retain the carriage in its upper case position. The parts may be released by depressing shift key lever 194 sufficiently to release latch 224, the spring 225 of which will then assert itself and move shift locking key lever 222 into its normal position; and, at the same time, spring 213ª will restore shift key lever 194 to its normal position. The release of latch 224 in the manner described will also restore the locking dogs to their normal position, locking dog 218 being moved away from, and locking dog 215 being moved into engagement with, shift locking plate 217. The upward movement of shift rail 172 will be communicated to the roller 175 that is supported by clamps 176 of shiftable carriage and the latter will rise with a parallel movement by reason of parallel arms 93 and 97 swinging on centers 53 and 98. Owing to vertical slots 192 in the end standards 51 of the traveling carriage, the shaft of platen 9 will be free to rise with the shiftable carriage. When the shift rail is lowered, gravity will restore the shiftable carriage to its lower case position, this movement also being insured by reason of track portion 173 and horizontal guides 177. It will, of course, be understood that the transversely traveling carriage will carry the shiftable carriage with it when the latter is in either upper or lower case position and that said movement is facilitated by roller 175, that travels on track 173 of shift rail 172.

In addition to the function of raising and lowering the shiftable carriage, shift rail 172 also performs the function of shifting certain auxiliary instrumentalities that are necessary to properly effect printing and other manipulation of the machine in either lower or upper case position. In the present instance, this result is obtained in the following manner. Carried on the front face of shift rail 172 is a rectangularly shaped frame 229 (see Figs. 2, 3 and 19) that constitutes a bracket for a card holder support 230 that carries a card holder 231 and a scale 232, their construction in the present instance being substantially the same as that shown in U. S. Letters Patent No. 1,121,829. Bracket 229 also supports one end of a ribbon vibrator control shaft 233, the other end of which is carried in a bearing bracket 234 also mounted on the face of the shift rail. Shaft 233 carries two cams. One, 235, is a selector cam (see Fig. 16) with which engages dog 236 pivotally supported at 237 on the escapement frame; and the other, 238, a stop cam (see Fig. 19) that limits movement of the ribbon vibrator. On the rear face of the shift rail is a bracket 239 that acts as a bearing for a ribbon vibrator actuating rock shaft 240 carrying a ribbon vibrator bell crank 241 connected at 242 with a ribbon vibrator 243 slidingly mounted by means of guides 244 on a stationary type bar guide 245 mounted in segment 3. Carried by the ribbon vibrator bell crank is a horizontally disposed lever 246 connected by means of a link 247 with a stop cam 238. During the printing operation, a universal bar 248 (see Figs. 1 and 17) mounted on a swinging frame 249 engages horizontally disposed lever 246 to effect movement of the ribbon vibrator as fully explained in U. S. Letters Patent No. 1,088,- 790. Selector cam 235 on shaft 233 is adjustable by means of a bar 250, to select different zones of the ribbon in the manner fully described in said United States Letters Patent No. 1,088,790. It will therefore be understood from the foregoing that the ribbon vibrator and selector means are so located as to shift with the shift rail so that the proper action will take place both in upper and lower case position. In connection with this it will be observed that a spring 251 that urges a dog 236 into engagement with selector cam 235 is anchored on the lower end of the shift rail (see Fig. 16) so that said dog, which is mounted on the escapement frame, will follow the rising and falling movement of cam 235. It will also be seen that a spring 252 that urges ribbon vibrator bell crank 241 into its normal position is anchored on a hook 253 (Figs. 7 and 19) that constitutes a part of rear bracket 239 on the shift rail. The carriage escapement mechanism shown in connection with this invention is substantially that disclosed in U. S. Letters Patent No. 1,212,929 and consists essentially (see Fig. 5) of a rocker plate 254 mounted in center bearings 255 projecting from forwardly extending arms 24 of the escapement frame. This rocker plate is actuated by a trip plate 256 (Fig. 17) on a rocking frame 249 and is provided with the usual escapement dogs such as a detent dog 257 and a limber dog 258. (Fig. 19.) The dogs are held in normal position by a spring 259, one end of which is engaged with rocker plate 254 and the other end of which is connected with an adjustable bracket 260 slidingly mounted on the escapement frame (see Fig. 17). One characteristic feature of this construction is, however, adjustable eccentrics 261 carried in a horizontal overhanging portion 262 extending inwardly from one of arms 24 of the escapement frame. As seen best in Figs. 3, 5 and 19 rocker plate 254 has a stop arm 263 the movement of which is limited by said eccentric stops 261. It may also be noted here that the back space guide plate 264 (see Figs. 3 and 5) is integral with rear plate 23 of the escapement frame.

The spring barrel and its supporting means are constructed as follows (see Figs. 3, 14 and 25 to 31 inclusive): A bracket consisting of a connecting portion 265 is provided with two downwardly extending arms 266 and 267, the bracket being secured to the rear wall of the frame by means of screws passing into arm 267. 268 indicates a spring barrel shaft mounted in said arms and having an outboard extension 268ª that projects beyond the arms of the bracket. Mounted loosely at the forward end of said outboard extension is a core 269 to which one end of spring 270 is attached, its other end being secured to the spring barrel in a manner well understood; and said core is provided with a reduced portion 271 having slots 272 for the reception of tongues 273 carried by spring barrel shaft 268ª. In the present instance, said tongues are formed by struck-up portions from a sheet metal head 274 carried on the outer end of said outboard extension so that rotation of the shaft will adjust the position of the core whereby the tension of the spring may be varied in a manner well understood. The adjusting means for the shaft in this instance are located intermediate arms 266 and 267 and consist of an upwardly extending screw 275 mounted in an upwardly extending bushing 276 and engaging with a screw gear 277 carried by sleeve 278 secured to the shaft 268 by screws 279. Consideration of Figs. 3 and 14 will demonstrate that the adjusting means for the tension of the spring is rendered very accessible being, as a matter of fact, directly beneath the left hand rear dust shed of the casing. Core 269 is provided with an extension 280 for the reception of a ball bearing 281, said bearing being held in place by a lock nut 282 engaging a threaded portion of an extension 280. 283 is a cup shaped member of sheet-metal constituting with a removable plate 284 a spring barrel. Said cup shaped portion 283 is provided with a neck portion 285 secured to one member of the ball bearing 281, said ball bearing being in effect housed within said neck portion. A spring barrel gear 286 is suitably secured to the spring barrel and engages with the usual pinion-and-ratchet drive mounted on a ribbon feed shaft 287 carried by arm 266 in a manner similar to the construction shown in U. S. Letters Patent No. 859,294. 288 indicates back space-controlling dogs that conveniently find their support on a gland 289 that holds them in position against arm 266. Fig. 3 shows that the spring barrel shaft extends longitudinally of the machine substantially the entire distance between the rear wall of the frame work and the shift rail. In order to admit of the removal of such spring barrel shaft, such shift rail is provided with an oversize hole 290 (see Fig. 2) which is axially co-incident with the spring barrel shaft when the shift rail is in its upper case position. By this means the spring barrel shaft may be withdrawn or inserted through the shift rail. The bracket that supports the spring barrel structure is provided with a bearing 291 in which is hung one arm 292 of a rocking universal frame 19; the other end of said frame being supported by a bracket 293 secured to the rear wall of the frame work and carrying an arm 294 of said universal frame.

The construction of the spring barrel and its supporting means herein disclosed is claimed in application Ser. No. 392,265 filed June 28, 1920.

The shift key lever system herein disclosed is claimed in application Ser. No. 394,672 filed July 8, 1920.

The construction of the shiftable carriage herein disclosed is claimed in application Ser. No. 404,534 filed August 19, 1920.

The construction of the line space advancing mechanism herein disclosed is claimed in an application Ser. No. 399,376, filed July 27, 1920.

The construction of the overhead bail actuating means and the paper pan actuating means herein disclosed is claimed in application Ser. No. 569,321, filed June 19, 1922.

The feature of providing raceways 4 and 50 with central gutters herein disclosed is claimed in application Ser. No. 569,322, filed June 19, 1922.

We claim:

1. A typewriting machine comprising: framing, a platen, normally forwardly recumbent type bars in front of the platen, a transversely movable carriage having a rearwardly extending overhanging portion, a monorail support for the carriage directly beneath the platen and in rear of the typebars, a transversely extending guide rod carried by the ovehanging portion, supporting means on the framing in which said rod slides, a shiftable carriage mounted on the transversely movable carriage and supporting the platen, two parallel pairs of arms, one pair carried by the transverse guide rod and another pair pivotally supported in said overhanging portion, both pairs pivotally connected with the shiftable carriage.

2. A typewriting machine comprising: framing, a platen and platen shaft, normally forwardly recumbent type bars in front of the platen, a transversely movable carriage having a rearwardly extending overhanging portion, a monorail support for the carriage directly beneath the platen and in rear of the typebars, a transversely extending guide rod carried by the overhanging portion, supporting means on the framing in which said rod slides, a shiftable carriage mounted on the transversely movable carriage and supporting the platen, a pair of parallel arms carried by the transverse guide rod, sleeves on the outer ends of said arms surrounding the platen shaft, and a second pair of parallel arms pivotally connected to the transversely movable carriage and to the shiftable carriage.

3. A typewriting machine comprising: framing, a platen and platen shaft, normally forwardly recumbent type bars in front of the platen, a transversely movable carriage having a rearwardly extending overhanging portion, a monorail support for the carriage directly beneath the platen and in rear of the typebars, a transversely extending rockshaft carried by the overhanging portion, supporting means on the framing in which said rockshaft slides, a shiftable carriage mounted on the transversely movable carriage and supporting the platen, a pair of parallel arms secured to the rockshaft and pivotally connected with the shiftable carriage, and a second pair of parallel arms pivotally connected to the transversely movable carriage and to the shiftable carriage.

4. A typewriting machine comprising: framing, a platen and a platen shaft, normally forwardly recumbent typebars in front of the platen, a transversely movable carriage having a rearwardly extending overhanging portion, a monorail support for the carriage directly beneath the platen and in rear of the typebars, a transversely extending rockshaft carried by the overhanging portion, supporting means in the framing in which said rockshaft slides, a shiftable carriage mounted on the transversely movable carriage and supporting the platen, two parallel pairs of arms, one pair secured to the rockshaft and pivotally connected with the platen shaft, and another pair pivotally supported in said overhanging portion and pivotally connected with the shiftable carriage.

5. In a typewriting machine, a main framework having side and rear walls, a lower non-shifting raceway extending transversely across the machine and supported on the sidewalls of the framework, and means for adjusting said raceway fore-and-aft of the machine.

6. In a typewriting machine, a main framework having side and rear walls, a lower non-shifting raceway extending transversely across the machine and supported on the sidewalls of the framework, and escapement framing forming a longitudinal bridge centrally of the machine and secured to the rear wall and lower raceway.

7. In a typewriting machine, a main framework having side and rear walls, a lower non-shifting raceway extending transversely across the machine and supported on the sidewalls of the framework, escapement framing forming a longitudinal bridge centrally of the machine and secured to the rear wall and lower raceway, and means for effecting fore-and-aft adjustment in unison of the lower raceway and escapement framing with respect to the main framework.

8. In a typewriting machine, a main framework having side and rear walls, a lower non-shifting raceway extending transversely across the machine and supported on the sidewalls of the framework, escapement framing forming a longitudinal bridge centrally of the machine and secured to the rear wall and lower raceway, and means for effecting fore-and-aft adjustment in unison of the lower raceway and escapement framing with respect to the main framework including: a block carried at each end of the raceway mounted in longitudinal guides in said sidewalls, a vertical guide in each of said blocks, and a rotatable adjusting member mounted in each sidewall and accessible for adjustment from the exterior thereof and having an eccentric portion extending into the vertical guide.

9. In a typewriting machine, a main framework having side and rear walls, a lower non-shifting raceway extending transversely across the machine and supported on the sidewalls of the framework, escapement framing forming a longitudinal bridge centrally of the machine and secured to the rear wall and lower raceway, an adjustable connection between the rear of the escapement framing and rear wall of the main frame, and means, accessible for adjustment from the exterior of the sidewalls, for effecting fore-and-aft adjustment of the raceway and escapement framing in unison.

10. In a typewriting machine, a main framework having side and rear walls, a lower non-shifting raceway extending transversely across the machine and supported on the sidewalls of the framework, escapement framing forming a longitudinal bridge centrally of the machine and secured to the rear wall and lower raceway, means for effecting fore-and-aft adjustment in unison of the lower raceway and escapement framing with respect to the main framework including: a center stop bracket on the rear wall of the main frame, and an adjustable connection between the rear of escapement framing and said center stop bracket.

11. In a typewriting machine, a main framework having side and rear walls, a lower non-shifting raceway extending transversely across the machine and supported on the sidewalls of the framework, escapement framing forming a longitudinal bridge centrally of the machine and secured to the rear wall and lower raceway, means for effecting fore-and-aft adjustment in unison of the lower raceway and escapement framing with respect to the main framework, including: a rectangular-shaped sheet metal escapement frame composed of a rear plate, forwardly extending arms and upwardly extending arms having horizontally disposed and transversely extending faces secured to said raceway, an escapement wheel support secured to the rear plate of the sheet metal frame, and connecting means between the escapement wheel support and the rear wall of the main frame.

12. In a typewriting machine, a main framework having side and rear walls, a lower non-shifting raceway extending transversely across the machine and supported on the sidewalls of the framework, escapement framing forming a longitudinal bridge centrally of the machine and secured to the rear wall and lower raceway, means for effecting fore-and-aft adjustment in unison of the lower raceway and escapement framing with respect to the main framework, including: a rectangular-shaped sheet metal escapement frame composed of a rear plate, forwardly extending arms and upwardly extending arms having horizontally disposed and transversely extending faces secured to said raceway, an escapement wheel support secured to the rear plate of the sheet metal frame, and an angle plate secured to the escapement wheel support and having a slotted connection with the rear wall of the main frame.

13. In a typewriting machine, a main framework having side and rear walls, a lower non-shifting raceway extending transversely across the machine and supported on the sidewalls of the framework, escapement framing forming a longitudinal bridge centrally of the machine and secured to the rear wall and lower raceway, and means for effecting fore-and-aft adjustment in unison of the lower raceway and escapement framing with respect to the main framework including: a block carried at each end of the raceway mounted in longitudinal guides in said sidewalls, a vertical guide in each of said blocks, a rotatable adjusting member mounted in each sidewall and accessible for adjustment from the exterior thereof and having an eccentric portion extending into the vertical guide; and means for securing the lower raceway and each block together including: a dowel pin the head of which is seated in an opening in the lower raceway and the shank of which extends into the block, and a binding screw extending from the block into the lower raceway.

14. A typewriting machine comprising a platen, normally forwardly recumbent type bars in front of the platen, a frame portion in rear of the forwardly recumbent type bars having fore-and-aft adjustment, a transversely traveling carriage mounted on said frame portion in rear of the type bars and a shiftable carriage mounted on said transversely traveling carriage and supporting the platen.

15. A typewriting machine comprising a platen, normally forwardly recumbent type bars in front of the platen, a frame portion in rear of the forwardly recumbent type bars having fore-and-aft adjustment, a transversely traveling carriage mounted on said frame portion in rear of the type bars, a shiftable carriage mounted on said transversely traveling carriage and supporting the platen, a shift rail for the vertically movable carriage, an upper and a lower pair of parallel links pivotally connected with the shift rail, pivotal supports on the adjustable frame portion for the upper pair of links, and pivotal supports independent of the adjustable frame portion for the lower pair of links.

16. In a typewriting machine, a framing, a stationary lower raceway, a transversely traveling carriage on said raceway, a shiftable carriage on the transversely traveling carriage, a platen on the shiftable carriage, a shift rail for raising and lowering the shiftable carriage, and means for effecting fore-and-aft adjustment of the lower raceway and shift rail in unison.

17. In a typewriting machine, a transversely extending relatively stationary carriage raceway, a longitudinally extending relatively stationary escapement frame in rear of and connected to said raceway, and a shift rail extending transversely above said escapement frame in rear of said raceway.

18. In a typewriting machine, a transversely extending relatively stationary carriage raceway, a substantially rectangular shaped escapement frame in rear of and beneath said raceway and connected to the underside thereof, a shift rail extending transversely above said escapement frame in rear of said raceway, and a substantially rectangular shaped bracket on the front face of the shift rail extending forwardly beneath the raceway.

19. In a typewriting machine, a transversely extending relatively stationary carriage raceway, a sheet metal escapement frame, in rear of and beneath said raceway, consisting of a rear plate, forwardly extending arms and upwardly extending arms having horizontally disposed faces, separated by a gap, extending transversely toward each other, a shift rail extending transversely above the forwardly extending arms and in rear of the raceway, and a substantially rectangular shaped bracket carried by the front face of the shift rail extending forwardly under the raceway, and between the forwardly extending arms and beneath the horizontally disposed faces of the escapement frame.

20. In a typewriting machine, a transversely extending relatively stationary carriage raceway, a sheet metal escapement frame, in rear of and beneath said raceway, consisting of a rear plate, forwardly extending arms and upwardly extending arms having horizontally disposed faces, separated by a gap, extending transversely toward each other, a shift rail extending transversely above the forwardly extending arms and in rear of the raceway, a substantially rectangular shaped bracket carried by the front face of the shift rail extending forwardly under the raceway, and between the forwardly extending arms and beneath the horizontally disposed faces of the escapement frame, and a bearing bracket carried by the rear face of the shift rail above one of the forwardly extending arms of the escapement frame and having angularly disposed extensions on both sides of one of said forwardly extending arms.

21. In a typewriting machine, a transversely extending relatively stationary carriage raceway, a sheet metal escapement frame, in rear of and beneath said raceway, consisting of a rear plate, forwardly extending arms and upwardly extending arms having horizontally disposed faces, separated by a gap, extending transversely toward each other, a shift rail extending transversely above the forwardly extending arms and in rear of the raceway, a substantially rectangular shaped bracket carried by the front face of the shift rail extending forwardly under the raceway, and between the forwardly extending arms and beneath the horizontally disposed faces of the escapement frame and consisting of a rear wall, forwardly extending walls and spaced front walls extending toward each other from the forwardly extending walls.

22. A typewriting machine comprising a platen, normally forwardly recumbent type bars in front of the platen, a transversely extending monorail supported on the framing of the machine in rear of the typebars, a transversely movable carriage adapted to travel on the monorail, a support to maintain the transversely movable carriage on the monorail, and a shiftable platen carriage mounted on the traveling carriage.

23. A typewriting machine comprising a platen, normally forwardly recumbent type bars in front of the platen, a transversely extending monorail supported on the framing of the machine in rear of the typebars, means for effecting fore-and-aft adjustment of the monorail, a transversely movable carriage adapted to travel on the monorail, a support to maintain the transversely movable carriage on the monorail, and a shiftable platen carriage mounted on the traveling carriage.

24. In a typewriting machine; framing, a transversely extending monorail supported on the framing, means for effecting fore-and-aft adjustment of the monorail, and a transversely movable carriage adapted to travel on said monorail.

25. In a typewriting machine; framing, a transversely extending monorail supported on the framing, a transversely movable carriage adapted to travel on said monorail, a shiftable platen carriage mounted on the transversely movable carriage, and means for effecting fore-and-aft adjustment in unison of the monorail and carriages.

26. In a typewriting machine; framing, a transversely extending monorail having a grooved raceway and a gear feed rack, a transversely movable carriage provided with a grooved raceway and a gear feed rack, balls between the monorail and carriage raceway having encircling pinions meshing with the feed racks, a platen carriage vertically shiftable on the transversely movable carriage, and means for adjusting in unison the monorail and carriage and gearing carried thereby in a horizontal plane substantially at right angles to the movement of the shiftable platen carriage.

27. In a typewriting machine; a transversely traveling carriage, a shiftable carriage, having a platen mounted in the transversely traveling carriage, and a monorail for the transversely traveling carriage located substantially directly under the vertical center line of the platen.

28. In a typewriting machine; a transversely traveling carriage, a shiftable carriage, having a platen mounted in the transversely traveling carriage, and a monorail for the transversely traveling carriage located substantially directly under the vertical center line of the platen, and means for adjusting in unison the monorail and carriages in a horizontal plane substantially at right angles to the movement of the shiftable platen carriage.

29. A typewriting machine comprising; framing, a platen, normally forwardly recumbent type bars in front of the platen, a transversely extending monorail supported on the framing, a transversely traveling carriage on said monorail, a vertically shiftable carriage mounting the platen and carried by the transversely traveling carriage, and means located at both sides of the framing for adjusting the front face of the platen, in either normal or shifted position, with respect to the typebars.

30. A typewriting machine comprising; framing, a platen, normally forwardly recumbent type bars in front of the platen, a transversely extending monorail supported on the framing, a transversely traveling carriage on said monorail, a vertically shiftable carriage mounting the platen and carried by the transversely traveling carriage.

31. A typewriting machine comprising; framing, a platen, normally forwardly recumbent type bars in front of the platen, a transversely extending monorail supported on the framing, a transversely traveling carriage on said monorail, a vertically shiftable carriage mounting the platen and carried by the transversely traveling carriage, and means located at both sides of the framing for independently moving opposite ends of the platen in either normal or shifted position thereof, to thereby adjust the front face of the platen with respect to the typebars.

32. In a typewriting machine; framing, a transversely extending monorail secured to the framing, a transversely traveling carriage on said monorail, an escapement rack carried by said carriage, an escapement pinion engaging said rack, a shiftable platen carriage on the transversely movable carriage and means for effecting fore-and-aft adjustment in unison in a horizontal plane of the monorail, the carriages and the escapement mechanism.

33. In a typewriting machine; a vertically shiftable platen, a monorail below the platen, and means for moving either or both ends of the platen fore-and-aft in unison with said monorail.

34. In a typewriting machine; a transversely extending monorail having a centrally disposed and rearwardly extending bridge, a roller support on said bridge, a transversely traveling carriage on the monorail, rearwardly extending overhanging portions in the carriage, a transversely extending tie rod connecting said overhanging portions and riding on the roller support, and a vertically shiftable platen supported by the carriage directly above said monorail.

35. In a typewriting machine; a transversely extending monorail, a transversely traveling carriage on the monorail, a vertically shiftable carriage on the transversely traveling carriage, means for adjusting the monorail, and thereby the carriages, at either or both of its ends.

36. In a typewriting machine; a transversely extending monorail, a rearwardly extending bridge connected to the monorail, a transversely traveling carriage on the monorail, escapement mechanism between the bridge and the transversely traveling carriage, a vertically shiftable carriage on the transversely traveling carriage, and means for adjusting the monorail, and thereby the carriages and escapement mechanism, at either or both of its ends.

37. In a typewriting machine; a transversely extending monorail, a transversely traveling carriage mounted thereon, a shiftable platen carriage mounted on the transversely traveling carriage, a shift rail, connected to the monorail, for elevating the platen carriage, and means for effecting fore-and-aft adjustment in unison of the monorail, the carriages and the shift rail.

38. In a typewriting machine; framing, a transversely extending monorail secured to the framing, a rearwardly extending portion on the monorail, a transversely traveling carriage on the monorail, escapement means between the carriage and rearwardly extending portion, and means for effecting fore-and-aft adjustment in unison of the monorail, with its rearwardly extending portion, and the carriage.

39. In a typewriting machine, a relatively stationary carriage raceway, a carriage traveling on said raceway, a shiftable carriage mounted on said traveling carriage, a platen on said shiftable carriage, a shift rail for lifting and lowering the shiftable carriage, a ribbon vibrator slidingly mounted in front of the platen, means carried by the shift rail for adjusting the position of the ribbon vibrator when the platen is shifted, means carried by the shift rail for actuating the ribbon vibrator in both its normal and shifted positions, and a card guide and scale support carried on the shift rail.

40. In a typewriting machine, a relatively stationary carriage raceway, a carriage traveling on said raceway, a shiftable carriage mounted on said traveling carriage, a platen on said shiftable carriage, a shift rail for lifting and lowering the shiftable carriage, a ribbon vibrator slidingly mounted in front of the platen, means carried by the shift rail for adjusting the position of the ribbon vibrator when the platen is shifted, means carried by the shift rail for actuating the ribbon vibrator in both its normal and shifted positions, a card guide and scale support carried on the shift rail, and lower feed pressure rolls for the platen carried by the shiftable carriage.

41. In a typewriting machine, a relatively stationary carriage raceway, a carriage traveling on said raceway, a shiftable carriage mounted on said traveling carriage, a platen on said shiftable carriage, a shift rail for lifting and lowering the shiftable carriage, a ribbon vibrator slidingly mounted in front of the platen, means carried by the shift rail for adjusting the position of the ribbon vibrator when the platen is shifted, means carried by the shift rail for actuating the ribbon vibrator in both its normal and shifted positions, a card guide and scale support carried on the shift rail, lower feed pressure rolls for the platen carried by the shiftable carriage, and scale indication means adjacent the front face of the platen carried by the shiftable carriage.

42. In a typewriting machine, a lower relatively stationary carriage raceway, a shift rail in rear of the raceway, a bracket carried by said shift rail extending forwardly beneath the raceway, and a cardholder support mounted on said bracket and extending upwardly in front of the raceway.

43. In a typewriting machine, a lower relatively stationary carriage raceway, a shift rail in rear of the raceway, a ribbon vibrator slidingly mounted in front of the raceway, a bearing bracket carried by the shift rail, a ribbon vibrator actuating shaft carried by said bearing bracket, and connections between said actuating shaft and said ribbon vibrator extending beneath the raceway.

44. In a typewriting machine, a lower relatively stationary carriage raceway, a shift rail in rear of the raceway, a bracket carried by said shift rail extending forwardly beneath the raceway, and a ribbon vibrator control shaft carried by said bracket beneath the raceway.

45. In a typewriting machine, a lower relatively stationary carriage raceway, a shift rail in rear of the raceway, a bracket carried by the front face of said shift rail extending forwardly beneath the raceway, a bearing bracket carried by the rear face of said shift rail, a ribbon vibrator slidingly mounted in front of the raceway, a ribbon vibrator control shaft carried by the front bracket beneath the raceway, a ribbon vibrator actuating shaft carried by the rear bearing bracket, connections between said ribbon vibrator and actuating shaft extending beneath the front bracket and control shaft, and connections between the two shafts.

46. In a typewriting machine, a lower relatively stationary carriage raceway, a shift rail in rear of the raceway, a bracket carried by said shift rail extending forwardly beneath the raceway, a ribbon vibrator slidingly mounted in front of the raceway, a cardholder support mounted on said bracket and extending upwardly between the ribbon vibrator and raceway, and a ribbon vibrator control shaft mounted on the bracket beneath the raceway.

47. In a typewriting machine, a lower relatively stationary carriage raceway, a shift rail in rear of the raceway, a bracket carried by the front face of said shift rail extending forwardly beneath the raceway, a ribbon vibrator slidingly mounted in front of the raceway, a cardholder support mounted on said bracket and extending upwardly between the ribbon vibrator and raceway, and a ribbon vibrator control shaft mounted on the bracket beneath the raceway, a bearing bracket carried by the rear face of said shift rail, a ribbon vibrator actuating shaft carried by said rear bearing bracket, connections between the actuating shaft and ribbon vibrator extending beneath the front bracket and control shaft, and connections between the two shafts.

48. In a typewriting machine, a lower relatively stationary carriage raceway, a shift rail in rear of the raceway, a bracket carried by the front face of said shift rail extending forwardly beneath the raceway, a ribbon vibrator slidingly mounted in front of the raceway, a cardholder support mounted on said bracket and extending upwardly between the ribbon vibrator and raceway, and a ribbon vibrator control shaft mounted on the bracket beneath the raceway, a bearing bracket carried by the rear face of said shift rail, a ribbon vibrator actuating shaft carried by said rear bearing bracket, connections between the actuating shaft and ribbon vibrator extending beneath the front bracket and control shaft and connections between the two shafts, a selector cam on the control shaft, and a dog pivotally mounted on the rear bearing bracket for engagement with said cam.

49. In a typewriting machine, a lower relatively stationary carriage raceway, a shift rail in rear of the raceway, a bracket carried by the front face of said shift rail extending forwardly beneath the raceway, a bearing bracket carried by the rear face of said shift rail, a ribbon vibrator slidingly mounted in front of the raceway, a ribbon vibrator control shaft carried by the front bracket beneath the raceway, a ribbon vibrator actuating shaft carried by the rear bearing bracket, connections between said ribbon vibrator and actuating shaft, extending beneath the front bracket and control shaft, connections between the two shafts, a selector cam on the control shaft, and a dog pivotally mounted on the rear bearing bracket for engagement with said cam.

50. A shift rail, a forwardly extending bracket on the front face of the shift rail, and a cardholder support carried by the front face of the bracket.

51. A shift rail, a forwardly extending bracket on the front face of the shift rail, a cardholder support carried by the front face of the bracket, a bearing on the front face of the shift rail, and a ribbon vibrator control shaft carried by the bearing and bracket.

52. A shift rail, a forwardly extending bracket on the front face of the shift rail, a cardholder support carried by the front face of the bracket, said cardholder support consisting of a vertically arranged blank of sheet metal having integral sidewalls formed by bending the sides of the blank forwardly, and having an upward extension formed by bending the upper end of the blank forwardly and then upwardly.

53. A shift rail, a forwardly extending bracket on the front face of the shift rail, a cardholder support carried by the front face of the bracket, a bearing on the front face of the shift rail, a ribbon vibrator control shaft carried by the bearing and bracket, a rearwardly extending bearing bracket on the rear face of the shift rail, and a ribbon vibrator actuating shaft carried by said bearing bracket.

54. A shift rail, a forwardly extending bracket on the front face of the shift rail, a cardholder support carried by the front face of the bracket, a bearing on the front face of the shift rail, a ribbin vibrator control shaft carried by the bearing and bracket, a ribbon vibrator selector cam on said control shaft, a rearwardly extending bearing bracket on the rear face of the shift rail, and a pivotally supported stop dog carried by said bearing bracket and engaging with said selector cam.

55. In a typewriting machine, two vertical shift arms, a shift rail, and means for adjustably securing the rail and arms together including an angular extension, on one of the shift arms, having vertically elongated openings and a horizontally elongated slot adjacent one of said openings, an eccentric member seated in said horizontal slot having a stem passing through one of the vertically elongated openings and projecting through the shift rail, a nut surrounding the projecting portion of said stem and bearing against the shift rail and a binding screw passing through the other elongated opening and tapped into the shift rail.

56. In a typewriting machine, framing, two vertical shift arms, a shift rail carried thereby between the framing and the arms, an upper pair of links pivotally connected to the upper ends of the vertical shift arms extending through the shift rail and pivotally supported on the framing, and a lower and parallel pair of links pivotally connected to the lower ends of the shift arms, and pivotal supports for said lower links.

57. In a typewriting machine, side walls, a lower stationary raceway supported by said sidewalls, a transversely traveling carriage on said lower raceway, a shiftable carriage mounted on said traveling carriage, and a shift rail for said shiftable carriage having downwardly projecting extensions adjacent the sidewalls of the frame to take up the end thrust of the traveling carriage.

58. In a typewriting machine, framing, a stationary lower raceway, a block connected to each end of the raceway having fore-and-aft adjustment in the framing, a transversely traveling carriage on the raceway, a shiftable carriage mounted on the traveling carriage, two vertical shift arms, a shift rail between the blocks and the shift arms and supported by the latter, an upper pair of links pivotally supported on said blocks and extending through the shift rail and pivotally connected to the arms and a lower pair of links parallel to the first pair and pivotally connected to the lower ends of vertical arms and pivotal supports for said lower links.

Signed at New York city, in the borough of Manhattan, county and State of New York, this 6th day of May, 1920.

EDWARD B. HESS.
LEWIS C. MYERS.